United States Patent
Kerr-Delworth et al.

(10) Patent No.: US 8,566,375 B1
(45) Date of Patent: Oct. 22, 2013

(54) OPTIMIZATION USING TABLE GRADIENT CONSTRAINTS

(75) Inventors: Paul Kerr-Delworth, Cambridge (GB); Ian Noell, Cambridge (GB)

(73) Assignee: The MathWorks, Inc., Natick, MA (US)

(*) Notice: Subject to any disclaimer, the term of this patent is extended or adjusted under 35 U.S.C. 154(b) by 1450 days.

(21) Appl. No.: 11/647,107

(22) Filed: Dec. 27, 2006

(51) Int. Cl.
*G06F 7/00* (2006.01)
*G06F 15/00* (2006.01)

(52) U.S. Cl.
USPC ........................................... 708/200

(58) Field of Classification Search
USPC ........................................... 708/290
See application file for complete search history.

(56) References Cited

U.S. PATENT DOCUMENTS

| | | | |
|---|---|---|---|
| 5,470,288 A * | 11/1995 | Palansky et al. | 477/110 |
| 5,581,677 A * | 12/1996 | Myers et al. | 345/440 |
| 6,067,505 A * | 5/2000 | Bonoyer et al. | 702/85 |
| 6,374,780 B1 * | 4/2002 | Rutyna et al. | 123/41.12 |
| 6,415,761 B1 * | 7/2002 | McKenzie | 123/198 D |
| 6,957,137 B2 * | 10/2005 | Hubbard et al. | 701/54 |
| 6,968,261 B2 * | 11/2005 | Ghoneim et al. | 701/41 |
| 7,003,722 B2 * | 2/2006 | Rothchiller et al. | 715/212 |
| 2002/0129342 A1 * | 9/2002 | Kil et al. | 717/137 |
| 2005/0031197 A1 * | 2/2005 | Knopp | 382/154 |
| 2005/0077895 A1 * | 4/2005 | Hargreaves et al. | 324/307 |

OTHER PUBLICATIONS

1212—Using Meshgrid and Griddata to Fit Vector Data and Plot Unevenly Spaced Data, 2004, The Mathworks, pp. 1-11.*
Engineering Speardsheets—continuous interpolation in Excel, 2001, Tecumseh Group Inc, pp. 1-4.*

* cited by examiner

*Primary Examiner* — Chuong D Ngo
*Assistant Examiner* — Kevin G Hughes
(74) *Attorney, Agent, or Firm* — Harrity & Harrity, LLP

(57) ABSTRACT

A technique for operating on points having quantities associated therewith using a table gradient constraint is provided. The technique may include mapping the quantities onto cells, where at least one of the quantities is not on a cell prior to the mapping. The technique may further include applying a table gradient constraint to the mapped quantities, where the applying constrains quantities to maintain variation among the quantities within a bound.

82 Claims, 32 Drawing Sheets

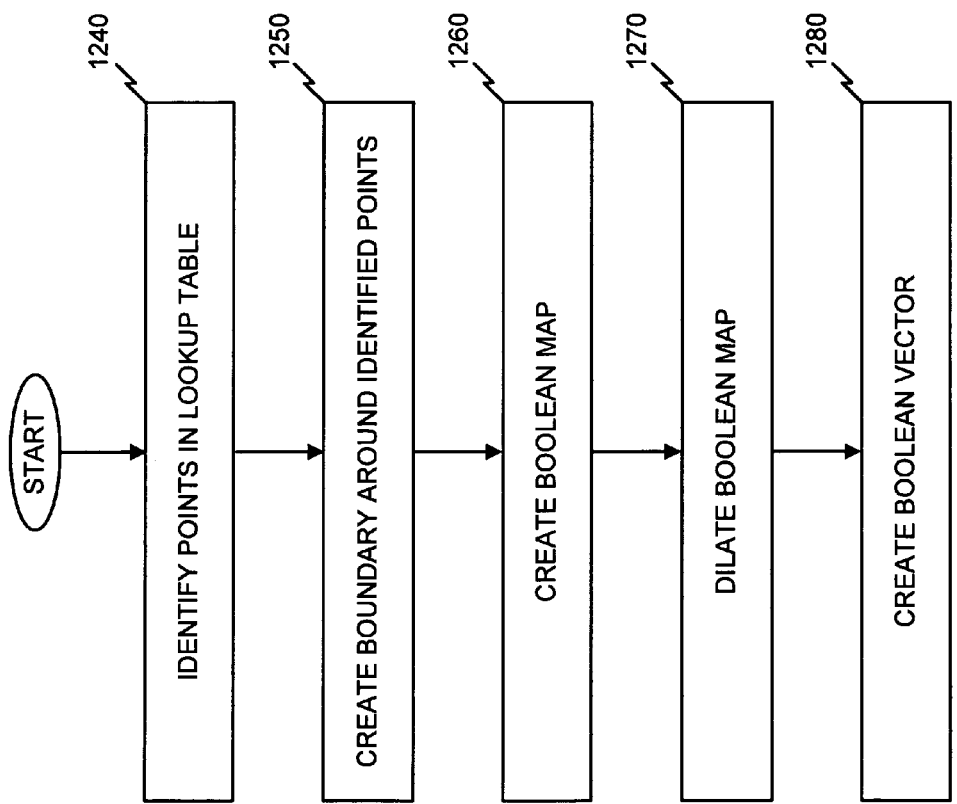

| API PROPERTY NAME | API PROPERTY INFORMATION |
|---|---|
| ConstrainedQuantity | Quantity to be constrained |
| TablesDefinition | Definition of the tables to be used in the constraint |
| GradientBounds | Definition of the bounds on the constrained quantity |
| SurfaceGenerationFunction | Function that will map the quantity to be constrained onto the grid points of the table(s). |
| FilterGridFunction | Function to determine which of the grid points from the table(s) will be used when evaluating the constraint |

| API FUNCTION NAME | API FUNCTION DESCRIPTION |
|---|---|
| con = creatorFunction( varargin ) | Creates a table gradient constraint |
| destructorFunction( con ) | Deletes any resources used by the table gradient constraint and allows for safe removal of con |
| outputValues = evaluateConstraint( con, inputValues ) | Evaluate the table gradient constraint at the supplied inputValues. Results are returned in outputValues. |
| conProp = getConstraintProperties( con, reqProperties ) | Return the property values for the required properties. |
| con = guiEditor( con, varargin ) | Display a graphical editor to allow constraint properties to be changed. |
| stat = isComplete( con ) | Return whether the constraint can be evaluated. |
| stat = isLinear( con ) | Return whether the constraint is linear. |
| con = setConstraintProperties ( con, reqProperties, reqPropertyVals) | Set the specified constraint properties (reqProperties) to the specified property values (reqPropertyVals) |
| conStr = toString( con ) | Return a string representation of the constraint object. |

FIG. 19A

| NAME | INFORMATION |
|---|---|
| AxisBreakpoints | Breakpoints of the "table". Specified as a 1-by-2 cell array, bpsAxis1 containing a 1-by-NROW vector of axis breakpoints, bpsAxis2 a 1-by-NCOL vector of axis breakpoints. |
| pAxisVariables | Pointers to axes variables. Specified as a 1-by-NAXES vector. |
| pVariable | Pointer to free variable to be constrained |
| Bounds | Gradient bounds on the variables. Specified as a NAXES-by-2 cell array, the first column of which defines the minimum and the second column defining the maximum. |
| SurfaceGenFunc | Handle to the function that will fit a surface to the supplied free variable points. |
| DistanceScale | A value that allows the constraint to calculate its range |
| FilterGridFcn | Function used to find the grid points that will be used in the calculation of the difference operator. Specified as a function handle to a function that conforms to the following API:<br>`map = FilterGridFcn( obj, pts )` |
| Version | Version number of the constraint code. |

FIG. 19B

| FUNCTION PROTOTYPE | INFORMATION |
|---|---|
| obj = cgtabgradconstraint( varargin ) | Constructor. |
| bps = getAxisBreapoints( obj, dim ) | Return the row breakpoints of the "table". Specifying dim returns the breakpoints of the dimth table axis. If dim is not specified, all table axis breakpoints are returned. |
| pAxisVariables = getAxisVariables( obj, dim ) | Returns pointers to the "table" axes variables. Specifying dim returns the dim-th table axis pointer. If dim is not specified, all table axis pointers are returned. |
| pVar = getVariable( obj ) | Returns the pointer to the free variable to be constrained. |
| bounds = getBounds( obj, dim ) | Return the gradient bounds. Specifying dim returns the dim-th gradient bounds. If dim is not specified, all gradient bounds in all directions are returned. |
| rng = getDistanceScale( obj ) | Return the distance scale held by the object. |
| pInp = getInputs( obj ) | Return the pointers to the object's input variables. |
| iPtrs = getInternalPtrs( obj ) | Return any internal pointers held by the object. |
| dPtrs = getDependentPtrs( obj ) | Return a list of dependent pointers for the table gradient constraint. A dependent pointer is a pointer to an object connected to the current which belongs to another CAGE object. |
| fhdl = getSurfaceGenFunc( obj ) | Return a function handle to the function that will generate the surface/interpolant |
| str = char( obj ) | Return a string representation of the object. |
| [Status, Message] = checkInputSizes( obj, InSize ) | Check the compatibility of input lengths. |

FIG. 19C

| FUNCTION PROTOTYPE | INFORMATION |
|---|---|
| ptrs = getptrs( obj ) | Return the pointers contained in the object. |
| [Status, Message] = checkSetup( obj ) | Check that the object has been set up correctly. |
| ok = isComplete( obj ) | Check whether the object setup is complete. |
| islin = isLinear( obj ) | Check whether the object is a linear constraint. |
| y = staticEvaluate( obj ) | Perform a static evaluation of the object. |
| data = collectStaticData( obj ) | Method that collects data to cache for static mode. |
| iconFile = largeIcon( obj ) | Return the name of the large icon file for this object. |
| [out, grad] = staticLHSEvaluate ( obj, IVals, EVals, GVals, GVars ) | Perform a static evaluation of the left hand side of the constraint. |
| [out, grad] = staticRHSEvaluate ( obj, IVals, EVals, GVals, GVars ) | Perform a static evaluation of the right hand side of the constraint. |
| filterGridFcn = getFilterGridFcn(obj) | Return the filter grid function handle. |
| nAxes = getNumAxes(obj) | Return the number of axes used in the constraint. |
|  |  |

FIG. 19D

| FUNCTION PROTOTYPE | INFORMATION |
|---|---|
| obj = destroy( obj ) | Destructor |
| obj = mapptr( obj, MapRef ) | Re-map object pointer locations |
| obj = setFilterGridFcn(obj, filterGridFcn) | Set the filter grid function handle |
| nOut = getNumOutputs( obj, InSize ) | Returns the number of output values that the item can produce, as a function of the lengths of the inputs. |
| str = texDescription( obj ) | Return a tex description string |
| [pExpr, EvalFuncs] = getStaticExpressions( obj, type ) | Get expressions that are required by static methods |
| obj = updateranges( obj ) | Update the input ranges that are used for the constraint |
| type = getType( obj ) | Get the type description for the object |
| obj = setAxisBreakpoints( obj, rowBps, dim ) | Set the row breakpoints of the "table". Specifying dim sets the breakpoints of the dim-th table axis. If dim is not specified, all table axis breakpoints are set from rowBps. |
| obj = setAxisVariables( obj, pAxes, dim ) | Sets pointers for the "table" axes variables. Specifying dim sets the dim-th table axis pointer. If dim is not specified, all table axis pointers are returned. |
| obj = setVariable( obj, pVar ) | Set the pointer to the free variable to be constrained. |

FIG. 19E

| FUNCTION PROTOTYPE | INFORMATION |
|---|---|
| obj = setSurfaceGenFunc( obj, fhdl ) | Set the function that will generate the surface/interpolant |
| obj = setBnds( obj, bnds, dim ) | Set the gradient bounds on the variable |
| hInfo = generateEditorPages<br>( obj, hPageGroup, pProj, pOptim ) | GUI to edit the table gradient constraint properties |

FIG. 19F

| FUNCTION PROTOTYPE | INFORMATION |
|---|---|
| map = pConvHullGridFilter( axisbp, pts ) | Filter grid points using a convex hull. |
| map = pIdentityGridFilter( axisbp, pts ) | Filter the grid points using an identity map. |
| [out, grad] = pEvaluate(obj, AxisValues, FreeValues, allD, allg, allIdxReq, allIdxReqCon) | Evaluate the constraint |
| [thisOut, thisGrad] = pEvaluateRun(obj, i, allFreeValues, allFixedValues, allD, allg, allIdxReq, allIdxReqCon, NPTS, nCon) | Evaluate the constraint at the i-th run of CAGE Optimization |
| [D, g, idxReq, idxReqCon] = pFilterGridPts(obj, pts, D, g) | Filter the grid points using the filter function specified in the table gradient constraint object |
| axisRngScale = pGetAxisRangeScale(obj) | Get the axis range scaling |
| [NPTS, NRUN] = pGetCommonEvaluateInfo(InputValues) | Return quantities needed by all evaluate methods |
| [D, g] = pGetDG(obj) | Return the gradient operator and bounds |
| [allD, allg, allIdxReq, allIdxReqCon, AxisValues, FreeValues] = pPrepareEvaluate(obj, InputValues) | Common calculations for all evaluate functions |
| [y, ygrad] = pRBFExtrapSurfaceGen (axisbp, pts, x) | RBF Surface Generation function |
| [y, ygrad] = pRBFSurfaceGen(axisbp, pts, x) | RBF Surface Generation function |
| scaledAxis = pScaleAxisPoints(obj, pts) | Scale axis points |

FIG. 19G

| NAME 1963 | INPUT PORTION 1982 INFORMATION 1973 |
|---|---|
| definitionData | Data structure that defines the table gradient constraint. This structure may contain information for the variables in Fig. 19I. |
| tableAxisEvaluationPoints | Matrix containing the points that the constraint will be evaluated at. This data may contain the axis coordinate values of the data in one exemplary implementation. |

| OUTPUT PORTION 1983 | |
|---|---|
| NAME | INFORMATION |
| constraintFunction | Function that can be used to evaluate the constraint. This function can be called using the following API<br>constraintValues = constraintFunction(quantityEvaluationPoints)<br>where quantityEvaluationPoints is the value of the quantity to be constrained at the evaluation points. |

FIG. 19H

| NAME | INFORMATION |
|---|---|
| TablesDefinition | Definition of the tables to be used in the constraint |
| GradientBounds | Definition of the bounds on the constrained quantity |
| SurfaceGenerationFunction | Function that will map the quantity to be constrained onto the grid points of the table(s). |

FIG. 19I

| 1985 | INPUT PORTION | |
|---|---|---|
| NAME 1963 | | INFORMATION 1973 |
| constraintFunction | | Evaluation of the constraint at evaluationPoints. |
| definitionData | | Data structure as defined in Table 2 |
| tableAxisEvaluationPoints | | Matrix containing data that the constraint will be evaluated at. This data must contain the axis coordinate values of the data only. |

| | OUTPUT PORTION 1987 | |
|---|---|---|
| NAME 1963 | | INFORMATION 1973 |
| A | | Linear matrix representing the table gradient constraint |
| B | | Inter-cell bounds on the gradient of the constrained quantity |

| INPUT PORTION /1989 | |
|---|---|
| NAME /1963 | INFORMATION /1973 |
| tableBreakpoints | A data structure containing the breakpoints of the table specified in the table gradient constraint |
| evaluationPoints | Points at which the table gradient constraint will be calculated |

| OUTPUT PORTION /1990 | |
|---|---|
| NAME /1963 | INFORMATION /1973 |
| booleanFilter | Boolean filter indicating which table cells are to be included in the table gradient constraint |

FIG. 19K

OPTIMIZATION USING TABLE GRADIENT CONSTRAINTS

BACKGROUND INFORMATION

Electronic control systems, such as electronic control systems that control automobile engines, may use lookup tables to characterize the system being controlled. System designers may wish to have lookup tables that allow the controlled system to perform according to certain parameters, such as parameters in a performance specification, and/or to satisfy certain objectives, such as objectives related to minimizing fuel consumption. For example, an improperly configured lookup table that is used with the automobile engine may cause the engine to run inefficiently. Drivers of automobiles that use the engine and improperly configured lookup table may find the abrupt changes unsatisfactory and/or may find that fuel consumption for the engine exceeds a desired fuel consumption rate.

System designers may attempt to calibrate lookup tables in order to identify how the lookup tables will perform when they are used to control a system. Lookup table calibration may require that the system designers have access to and/or manipulate information in the lookup tables. Conventional calibration techniques may not allow system designers to access and/or manipulate lookup table data when working with non-uniformly spaced data (for example, attempting to calibrate lookup tables using non-uniformly spaced data in an optimization). Accurate lookup table calibrations may be difficult or impossible to achieve using conventional calibration techniques with this type/configuration of data.

SUMMARY

In accordance with an aspect, a technique for operating on points having quantities associated therewith using a table gradient constraint is provided. The technique may include mapping the quantities onto cells, where at least one of the quantities is not on a cell prior to the mapping. The technique may further include applying a table gradient constraint to the mapped quantities, where the applying constrains quantities to maintain variation among the quantities within a bound.

In accordance with still another aspect, a technique for filtering points having quantities associated therewith is provided. The technique may include identifying cells within a boundary, where at least a portion of the cells include points, and where at least some of the quantities are mapped onto the identified cells via a mapping operation applied to quantities that did not correspond to cell locations prior to the mapping. The technique may include sending quantities within the boundary to a constraint that operates on the cells to produce constrained quantities, the constrained quantities associated with cells having mapped quantities associated therewith.

In accordance with yet another aspect, a technique implemented in a computing device is provided. The technique may include receiving constrained quantities related to a table, the table having quantities mapped to table cell locations prior to generating the constrained quantities using a table gradient constraint. The technique may include performing an operation using the constrained quantities, the operation performed in accordance with a desired operating parameter through the use of the constrained quantities.

In accordance with still another aspect, a technique for sending constrained quantities to a destination is provided. The technique may include identifying a number of constrained quantities produced by mapping a number of quantities onto a number of cells and performing a table gradient constraint on at least a portion of the mapped quantities, where the performing produces the constrained quantities. The technique may include sending the constrained quantities to the destination, the constrained quantities allowing the destination to perform a determined operation when the destination operates with the constrained quantities.

In accordance with yet another aspect, a computer readable medium holding executable instructions for performing a technique for operating on points having quantities associated therewith using a table gradient constraint is provided. The computer readable medium may include instructions for mapping quantities onto cells, where at least one of the quantities is not on a cell prior to the mapping. The computer readable medium may include instructions for applying a table gradient constraint to the quantities when the quantities are mapped onto the cells, the applying constraining the quantities according to a determined parameter.

In accordance with still another aspect, a computer readable medium holding instructions executed by a processing device to implement a technique for filtering a number of points having quantities associated therewith is provided. The computer readable medium may include instructions for identifying cells within a boundary, at least some of the cells including quantities mapped thereto via a mapping operation, and instructions for sending quantities within the boundary to a constraint to allow the constraint to operate on the cells.

In accordance with yet another aspect, a computer readable medium holding executable instructions for performing a technique on a receiving device is provided. The computer readable medium may include instructions for receiving constrained quantities, where the constrained quantities are formed by mapping quantities onto table cells and applying a table gradient constraint to the mapped quantities. The computer readable medium may include instructions for performing an operation using the constrained quantities, the operation performed in accordance with a desired operating parameter using the constrained quantities.

In accordance with still another aspect, a computer readable medium holding executable instructions for performing a technique for sending constrained quantities to a destination is provided. The computer readable medium may include instructions for identifying a number of constrained quantities produced by mapping a number of quantities onto a number of cells and performing a table gradient constraint on the mapped quantities, the performing producing the constrained quantities. The computer readable medium may include instructions for sending the constrained quantities to the destination, the constrained quantities allowing the destination to perform a determined operation when operating on the constrained quantities.

In accordance with yet another aspect, a code-based interface implemented in a computing device that executes instructions to constrain a quantity, is provided. The code-based interface may include an input portion that includes information defining a table gradient constraint to constrain the quantity, and includes information identifying a matrix containing locations at which the table gradient constraint is evaluated with respect to the quantity. The code-based interface may include an output portion that includes information about a function for evaluating the table gradient constraint at the evaluation locations, the function producing a result that includes a constrained quantity, where the constrained quantity is used by logic interacting with the interface to perform an operation.

In accordance with still another aspect, a code-based interface implemented in a computing device executing instructions to constrain a quantity represented by a linear constraint is provided. The code-based interface may include an input portion that can include information defining a table gradient constraint to constrain the quantity, and information identifying a matrix containing locations at which the table gradient constraint is evaluated with respect to the quantity. The code-based interface may include an output portion that can include information about a matrix that represents the linear constraint, and can include information about a vector that represents bounds on the constrained quantity; wherein information about the matrix and information about the vector are used to produce a constrained quantity, where the constrained quantity is used by logic interacting with the interface to perform an operation.

In accordance with yet another aspect, a device is provided. The device may include storage logic to store a grid that includes locations holding constrained quantities, the constrained quantities produced by, applying a table gradient constraint to quantities mapped onto the grid locations, the constrained quantities having inter-grid variations within a determined range that is related to the table gradient constraint. The device may include a processor to perform processing on behalf of the device by executing a number of instructions when interacting with at least a portion of the constrained quantities, and to generate a result, where the result used by the device to perform an operation.

In accordance with still another aspect, a computing device is provided. The computing device may include a memory storing quantities, a processor performing a mapping operation on quantities retrieved from the memory, the mapping associating the retrieved quantities with grid locations to produce mapped quantities, the processor further generating inter-grid gradients for the mapped quantities, and an optimizer operating on the inter-grid gradients to produce a result.

In accordance with yet another aspect, a system is provided. The system may include means for mapping a number of quantities onto grid locations, means for applying a table gradient constraint to the mapped quantities to produce constrained quantities, and means for optimizing using the constrained quantities, the optimizing means producing a result.

In accordance with still another aspect, a code-based interface, implemented in a computing device is provided. The code-based interface may include information identifying a data structure including breakpoints for a grid specified in a table gradient constraint. The code-based interface may include information identifying points having quantities associated therewith, at which the table gradient constraint will be calculated, the quantities mapped onto cells associated with the grid before calculating the table gradient constraint, and information identifying a filter, where the filter designates which cells are included in the table gradient constraint.

In accordance with yet another aspect, a technique for sending a calibrated table to a destination is provided. The technique may include sending a table that includes a number of constrained quantities, where the quantities are constrained by applying a table gradient constraint to quantities mapped to locations in the table prior to applying the table gradient constraint thereto, at least a portion of the constrained quantities satisfying a determined inter-cell bound, where the inter-cell bound is related to a calibration parameter for the table, the calibrated table used by the destination to perform an operation when the calibrated table is received by the destination.

In accordance with still another aspect, a technique for calibrating an engine is provided. The technique may include mapping quantities onto cells, where at least one of the quantities is not on a cell prior to the mapping, the quantities related to parameters of the engine. The technique may include applying a table gradient constraint to the mapped quantities, where the applying constrains quantities to maintain variation among the quantities within a bound.

In accordance with yet another aspect, a computer readable medium holding executable instructions for performing a technique for calibrating an engine is provided. The technique may include instructions for mapping quantities onto cells, where at least one of the quantities is not on a cell prior to the mapping, the quantities related to parameters of the engine. The technique may include instructions for applying a table gradient constraint to the quantities when the quantities are mapped onto the cells, the applying constraining the quantities within a bound.

BRIEF DESCRIPTION OF THE DRAWINGS

The accompanying drawings, which are incorporated in and constitute a part of this specification, illustrate one or more embodiments of the invention and, together with the description, explain the invention. In the drawings.

FIG. 12B illustrates exemplary processing for generating an active region as illustrated in FIG. 12A;

FIG. 19A illustrates an exemplary application program interface (API) that can be used with exemplary embodiments described herein;

FIG. 19B illustrates an exemplary data structure that can store properties information related to an exemplary application program interface;

FIGS. 19C-F illustrate a specific implementation of an API that can be used to evaluate and use a table gradient constraint;

FIG. 19G illustrates exemplary private functions in an exemplary API;

FIG. 19H illustrates an exemplary generic API that can be used to evaluate a table gradient constraint on a lookup table that may not include filtered points;

FIG. 19I illustrates an exemplary data structure that can store and/or identify information used by the exemplary API of FIG. 19H;

FIG. 19J illustrates an exemplary API that can provide greater efficiency as compared to the API of FIG. 19H in certain implementations, such as an implementation used to evaluate a table gradient constraint on a lookup table that may include filtered points in the case where the table gradient constraint can be written as a linear constraint;

FIG. 19K illustrates an exemplary API that can be used to generate a filter that can be used in conjunction with a table gradient constraint on a lookup table that may include filtered points;

DETAILED DESCRIPTION

Exemplary implementations, disclosed herein, may allow for the optimization of data stored in structures, such as matrices, tables, etc., where the data used for optimization may not coincide with determined locations within the structure (e.g., cells, table cells, grid points, etc.).

For example, disclosed techniques and apparatus can be used to optimize objective(s) evaluated at data points (hereinafter points) while simultaneously constraining a quantity or quantities, related to the data points, over lookup table(s), where the points do not coincide with cells in the lookup table. Exemplary techniques may determine values for the points at cell locations using interpolation techniques (e.g., radial basis functions (RBFs), thin plate splines, etc.) regression techniques (e.g., least squares fitting, robust regression, etc.), etc.

Exemplary techniques may further allow constraints to be placed on points associated with the lookup table. For example, table gradient constraints can be applied to points in a lookup table such that data values (or quantities) in adjacent table cells are maintained within a determined range. As used herein, adjacent can refer to cells in structures having one or more dimensions that are next to each other on a row, column, diagonal, etc.

Assume that it may be desirable to have data values in adjacent cells vary by no more than 0.06. Exemplary techniques may utilize table gradient constraints to optimize a goal or objective. The optimization techniques may iterate until the desired goal is substantially achieved, subject to the adjacent cell variation ≤0.06.

For example, an optimizer may be associated with an objective, or goal, of maximizing torque for an engine. A table gradient constraint may be employed with the optimizer to help ensure that data values between adjacent cells are within a determined range (or bound), where the determined range is selected so as to facilitate achieving the objective (or goal) (e.g., adjacent cell variation ≤0.06).

Exemplary techniques, embodiments/implementations, etc., are discussed and illustrated with respect to lookup tables for purposes of explanation; however, these techniques, embodiments/implementations, etc., should not be construed as being limited to the techniques, embodiments/implementations, etc., discussed herein. For example, exemplary techniques, embodiments/implementations, etc., can be used with other types of storage structures, such as matrices, grids, other types of tables, etc., that can have substantially any number of dimensions associated therewith.

Exemplary System

Figure 1:
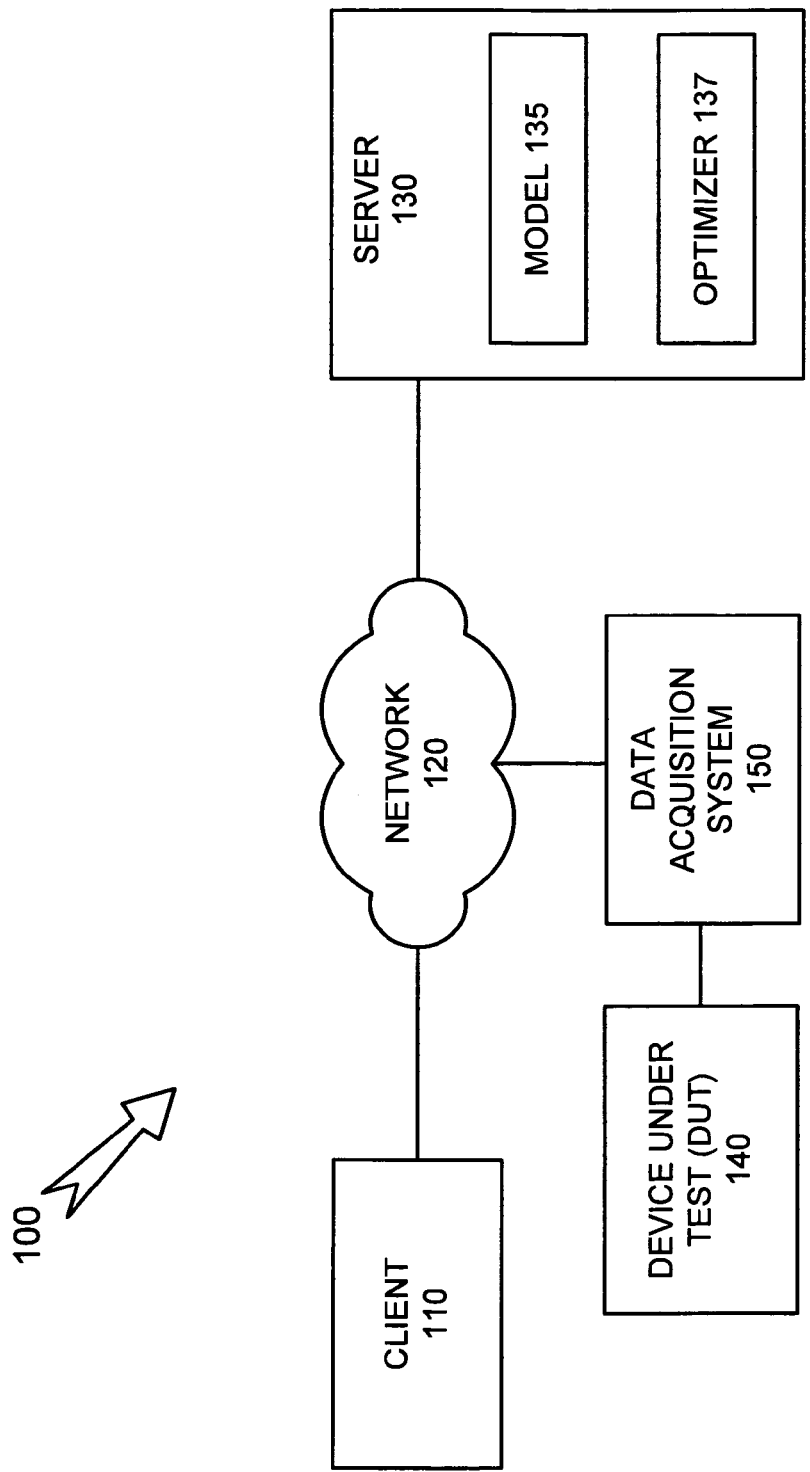
FIG. 1 illustrates an exemplary system that can be configured to practice an exemplary implementation.

FIG. 1 illustrates an exemplary system 100 that can be configured to practice one or more exemplary implementations. System 100 may include client 110, a network 120, a server 130, a device under test (DUT) 140 and a data acquisition system (DAS) 150. The embodiment of FIG. 1 is exemplary and other embodiments may include more devices, fewer devices, and/or devices in arrangements other than the arrangement of FIG. 1.

Client 110 may include a device capable of sending data to or receiving data from network 120. "Data," as used herein, may refer to any type of machine-readable information having substantially any format that may be adapted for use in one or more networks and/or with one or more devices. Data may include packetized information and/or non-packetized information. Client 110 may be a computer, such as a desktop computer, a laptop computer, a client, a server, a mainframe, a personal digital assistant (PDA), a web-enabled cellular telephone, a smart phone, smart sensor/actuator, or another computation or communication device that executes instructions to perform one or more activities and/or generate one or more results. In one implementation, client 110 may operate as a client device, or endpoint, and may attempt to access resources associated with network 120, such as server 130, etc.

In one embodiment, client 110 may include a computer operated by a user that runs a technical computing application residing locally on client 110 or residing remotely on server 130. Technical computing applications may let users perform computations related to disciplines, such as mathematics, engineering, scientific exploration, finance, education, medical research, etc. For example, a technical computing application may include dynamically typed languages that support array-based notations and/or computations to facilitate data analysis, modeling, simulation, etc.

An exemplary implementation of a technical computing application that can be used to practice exemplary embodiments is MATLAB® technical computing software sold by the MathWorks, Inc. of Natick, Mass. In one implementation, server 130 may serve MATLAB software to client 110. Client 110 may generate code using an input device (e.g., a keyboard) and may run the code on server 130 to produce a result, such as a plot. In another embodiment, client 110 may run other types of applications, such as modeling and/or simulation applications (e.g., Simulink®, Stateflow, SimEvents, SimMechanics, SimPowerSystems, SimHydraulics, SimDriveline, etc., software sold by the MathWorks, Inc. of Natick, Mass.). In still other embodiments, client 110 can run still other types of applications, such as a data acquisition application running on DAS 150, where the application obtains measurement related data from DUT 140.

Network 120 may include any network capable of transferring data (e.g., packet data or non-packet data). Implementations of network 120 may include local area networks (LANs), metropolitan area networks (MANs) and/or wide area networks (WANs), such as the Internet, that may operate using substantially any network protocol, such as Internet protocol (IP), asynchronous transfer mode (ATM), and/or synchronous optical network (SONET), user datagram protocol (UDP), IEEE 802.11, etc.

Network 120 may include network devices, such as routers, switches, firewalls, and/or servers (not shown). Network 120 may be a hardwired network using wired conductors and/or optical fibers and/or may be a wireless network using free-space optical, radio frequency (RF), acoustic, etc., transmission paths. In one implementation, network 120 may be a substantially open public network, such as the Internet. In another implementation, network 120 may be a more restricted network, such as a corporate virtual network. Implementations of networks and/or devices operating on networks described herein are not limited to any particular data type, and/or protocol.

Server 130 may include a device capable of receiving data from, and transmitting data to, another device and/or network. For example, server 130 may include one or more server devices/computers, a workstation, mainframe, desktop computer, laptop computer, PDA, web enabled cellular telephone, smart phone, Wi-Fi device, smart sensor/actuator, or another type of device.

Implementations of server 130, and/or other devices in system 100, can include substantially any type of computing architecture/components, such as silicon-based components and/or supporting architectures, quantum-based components and/or supporting architectures, biologic-based components and/or supporting architectures, optical-based components and/or supporting architectures, etc. Exemplary embodiments of server 130 may be implemented as a standalone device, or a cluster (pool) of devices arranged in substantially any type of configuration (e.g., a computing grid). Distributed implementations of server 130 may include devices, such as load balancers, network devices, etc., to allow distributed implementations of server 130 to operate in a determined manner.

In one implementation, server 130 may provide a service to other devices in system 100, such as client 110. For example, server 130 may host software applications for client 110, may provide remote storage for client 110, may act as a gateway between client 110 and another network, such as the Internet, etc. Hosted applications, etc., may be provided to client 110 as a managed service. Managed service, as used herein, refers to functionality provided from a source to a destination on a subscription basis (e.g., hourly, weekly, monthly, per central processing unit (CPU) cycle, per use, etc.).

In one embodiment, server 130 may include model 135 and optimizer 137 and may provide modeling capabilities and/or optimization capabilities to client 110 via network 120. Model 135 may include hardware or software based logic to model devices, components, systems, etc. For example, a user of client 110 may generate code representing a physical system, a process, an equation, etc., and may execute the code to model the system, process, equation, etc. Model 135 may output results to a user, file, device, etc. Model 135 may further receive measurement data from a device, such as DAS 150, and may process the data to generate one or more results. Model 135 may further use measurement data to model or simulate devices, systems, processes, applications, etc.

Optimizer 137 may include hardware or software based logic to optimize data related to model 135, DUT 140 and/or other systems, applications, devices, etc. For example, server 130 may receive data from client 110 or DAS 150. Server 130 may provide the data to model 135 and/or optimizer 137 and optimizer 137 may operate on the data using, for example, optimization algorithms/techniques. Optimizer 137 may optimize the data with respect to one or more parameters and may generate a result. Exemplary implementations of optimizer 137 may be called by software applications, such as a technical computing application, a graphical computing application, a textual simulation application, a graphical simulation application, etc. Alternatively, optimizer 137 may be called by a user via a command line prompt, graphical user interface, etc.

In an exemplary implementation, optimizer 137 may perform operations in order to characterize a lookup table. For example, optimizer 137 may perform a number of iterations to calibrate the lookup table so that the lookup table can perform in a determined manner (e.g., an optimized manner) in a device, system, application, etc., that uses the lookup table.

DUT 140 may include a device that provides information to DAS 150. For example, DUT 140 may be an engine that is tested in a laboratory to determine values for certain parameters associated with the engine, such as torque for a given engine speed, fuel consumption as a function of engine speed, engine vibration as a function of engine speed, etc. DUT 140 may include devices, components, systems, etc., that can be implemented in hardware based logic, software based logic, and/or hybrid logic that includes both hardware and software. For example, DUT 140 may, include a system or subsystem (e.g., a fuel system, exhaust system, ignition system, control system, etc.), components (e.g., valves, spark plugs, lookup tables, integrated circuits, etc.) and the like. In one exemplary implementation of system 100, DUT 140 may provide information to model 135 and/or optimizer 137. DAS 150 may include a device that receives measurement related data from another device. Implementations of DAS 150 may include sensors, such as accelerometers, temperature sensors, strain gauges, fiber optic sensors, tachometers, force gauges, etc., and may receive data in analog or digital form. Implementations of DAS 150 that receive data in analog form may convert the data to a digital form before sending the data to another device in system 100. In one embodiment, DAS 150 may provide measurement data to client 110, model 135 and/or optimizer 137.

Exemplary Device Architecture

Figure 2:
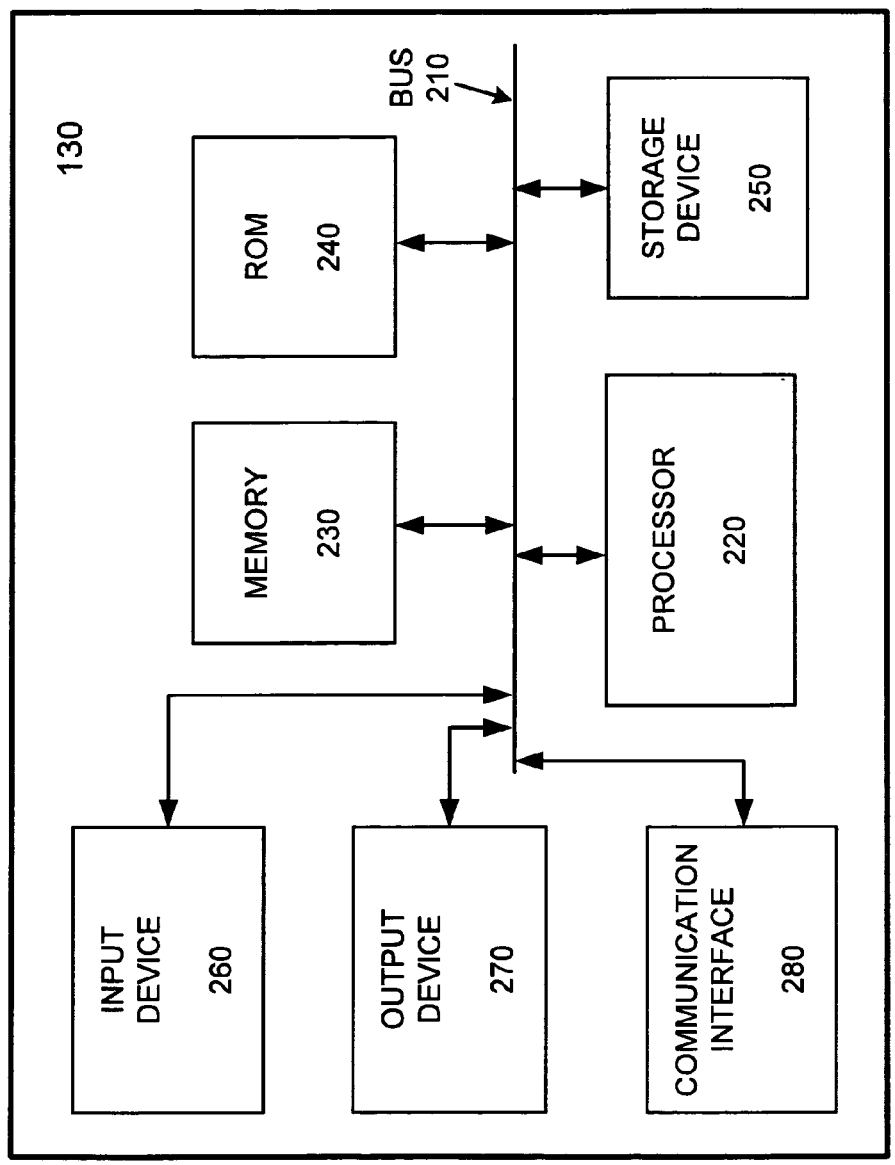
FIG. 2 illustrates an exemplary architecture for implementing the server device of FIG. 1.

FIG. 2 illustrates an exemplary architecture for implementing server 130 of FIG. 1. It will be appreciated that other devices that can be used with system 100, such as client 110, may be similarly configured. As illustrated in FIG. 2, server 130 may include a bus 210, a processor 220, a memory 230, a read only memory (ROM) 240, a storage device 250, an input device 260, an output device 270, and a communication interface 280.

Bus 210 may include one or more interconnects that permit communication among the components of server 130. Processor 220 may include any type of processor, microprocessor, or processing logic that may interpret and execute instructions (e.g., a field programmable gate array (FPGA)). Processor 220 may include a single device (e.g., a single core) and/or a group of devices (e.g., multi-core). Memory 230 may include a random access memory (RAM) or another type of dynamic storage device that may store information and instructions for execution by processor 220. Memory 230 may also be used to store temporary variables or other intermediate information during execution of instructions by processor 220.

ROM 240 may include a ROM device and/or another type of static storage device that may store static information and instructions for processor 220. Storage device 250 may include a magnetic disk and/or optical disk and its corresponding drive for storing information and/or instructions. Storage device 250 may include a single storage device or multiple storage devices, such as multiple storage devices operating in parallel. Moreover, storage device 250 may reside locally on server 130 and/or may be remote with respect to server 130 and connected thereto via network 120 and/or another type of connection, such as a dedicated link or channel.

Input device 260 may include any mechanism or combination of mechanisms that permit an operator to input information to server 130, such as a keyboard, a mouse, a touch sensitive display device, a microphone, a pen-based pointing device, and/or a biometric input device, such as a voice recognition device and/or a finger print scanning device. Output device 270 may include any mechanism or combination of mechanisms that outputs information to the operator, including a display, a printer, a speaker, etc.

Communication interface 280 may include any transceiver-like mechanism that enables server 130 to communicate with other devices and/or systems, such as client 110, device under test 140, DAS 150, etc. For example, communication interface 280 may include one or more interfaces, such as a first interface coupled to network 120 and/or a second interface coupled to optimizer 137 (e.g., where optimizer 137 is remote with respect to server 130). Alternatively, communication interface 280 may include other mechanisms (e.g., a wireless interface) for communicating via a network, such as a wireless network. In one implementation, communication interface 280 may include logic to send code to a destination device, such as a target device that can include general purpose hardware (e.g., a personal computer form factor), dedicated hardware (e.g., a digital signal processing (DSP) device adapted to execute a compiled version of a model or a part of a model), etc.

Server 130 may perform certain functions in response to processor 220 executing software instructions contained in a computer-readable medium, such as memory 230. A computer-readable medium may be defined as one or more memory devices and/or carrier waves. In alternative embodiments, hardwired circuitry may be used in place of or in combination with software instructions to implement features consistent with principles of the invention. Thus, implementations consistent with principles of the invention are not limited to any specific combination of hardware circuitry and software.

Exemplary Functional Diagram

Figure 3:
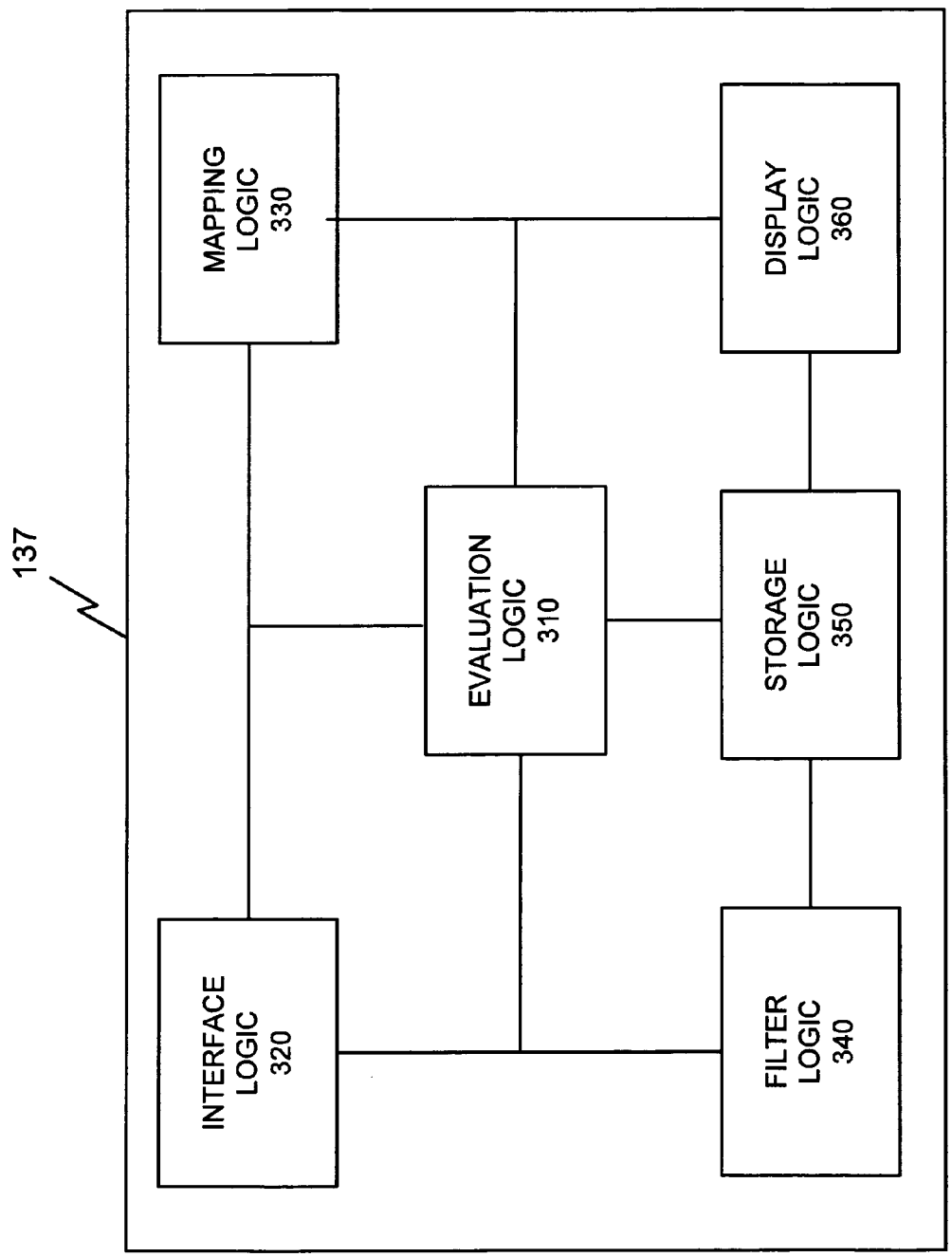
FIG. 3 illustrates an exemplary functional diagram of an optimizer.

FIG. 3 illustrates an exemplary functional diagram of optimizer 137. In one exemplary implementation, portions of optimizer 137 may be implemented in processor 220, memory 230, ROM 240, and/or storage device 250 on server 130. Other exemplary implementations of optimizer 137 may be implemented in other ways, such as a distributed configuration where portions of optimizer 137 operate on different platforms and/or in multiple cores operating on one or more platforms. Optimizer 137 can be implemented in hardware, software (e.g., as software objects), and/or hybrid based logic.

The functional diagram of FIG. 3 may include evaluation logic 310, interface logic 320, mapping logic 330, filter logic 340, storage logic 350, and display logic 360. The implementation of FIG. 3 is exemplary, and optimizer 137 may include more or fewer functional components without departing from the spirit of the invention.

Evaluation logic 310 may include hardware or software based logic to process instructions or data related to optimization activities, such as applying one or more optimization algorithms to information related to a device or system for which optimization activities are performed. For example, evaluation logic 310 may compute a derivative of an objective function, may add or subtract values, etc., in support of optimization activities on server 130.

Interface logic 320 may include hardware or software based logic that allows optimizer 137 to receive data from another device or software application or allows optimizer 137 to send data to another device or software application. In one implementation, interface logic 320 may include a code-based interface (e.g., an application program interface (API) that identifies a determined format for getting information (e.g., values) into or out of optimizer 137. API's used with optimizer 137 may be adaptable to allow optimizer 137 to interact with substantially any number and/or type of devices or software applications. Implementations of interface logic 320 may receive one or more points associated with a lookup table, may receive an objective function, may receive values related to linear and/or nonlinear constraints, etc.

Mapping logic 330 may include hardware or software based logic to perform mapping operations for data operated on by optimizer 137. For example, optimizer 137 may operate on specified points (regularly spaced or irregularly spaced) where these points may not correspond to locations of cells (e.g., table cells in a lookup table). Mapping logic 330 may map a quantity s from being defined at these specified points to being defined at points in the lookup table, e.g., points corresponding to lookup table cells. Mapping logic 330 may utilize any of a number of techniques that can be used to map a quantity from one location to another location.

For example, in a first exemplary embodiment, mapping logic 330 may operate with one or more interpolation techniques (e.g., interpolation algorithms) to perform mapping operations with respect to s. In a second exemplary embodiment, mapping logic 330 may operate with regression techniques (e.g., linear regression algorithms) to perform mapping operations with respect to s. In other exemplary embodiments, mapping logic 330 may operate with other types of algorithms and/or techniques to perform mapping operations with respect to s.

Optimizer 137 may use interpolation, regression, etc., results locally and/or may send interpolation, regression, etc., results to other devices and/or software applications operating on server 130 and/or elsewhere in system 100. Implementations of mapping logic 330 may operate with substantially any type of interpolation technique (e.g., but not limited to, RBFs, thin plate splines, Delaunay triangulation, spline interpolation, rational interpolation, etc.), regression techniques (e.g., but not limited to, least squares fitting, robust regression, etc.), and/or other mapping techniques.

Filter logic 340 may include hardware or software based logic to filter information (e.g., points) received by optimizer 137 or to filter information sent from optimizer 137 to another device or software application. For example, optimizer 137 may receive data that includes a noise component. Optimizer 137 may filter the data to reduce or remove the noise component before operating on the data using one or more optimization techniques.

Filter logic 340 may further direct processing activities to portions of a lookup table that include points (e.g., an active region of the lookup table). For example, when data in a lookup table is clustered in a region of the lookup table, filter logic 340 may cause algorithms operating on the data, such as interpolation, regression, and/or optimization algorithms, to exclude cell locations that are not proximate to the lookup table region containing the clustered data. Accuracy of results generated by optimizer 137 and/or other devices in system 100 may increase when table cells that are not proximate to clustered data are omitted from processing operations. Other implementations of filter logic 340 may perform still other activities on behalf of optimizer 137 and/or other devices in system 100, such as excluding data that is excessively noisy or that may be erroneous.

Storage logic 350 may include hardware or software based logic to store information related to optimizer 137. In one exemplary embodiment, storage logic 350 may store temporary or intermediate information generated by optimizer 137 and/or used by optimizer 137 while processing data. For example, storage logic 350 may store constraints used by optimizer 137, information about optimization problems operated on by optimizer 137, etc. In another embodiment, storage logic 350 may store results produced via application of optimization techniques using a table, such as a table having two or more dimensions.

Display logic 360 may include hardware or software based logic to display optimization results, optimization, parameters, etc., to a user of server 130 and/or client 110. Display logic 360 may pass information through interface logic 320, such as by sending display data through interface logic 320 to output device 270 (FIG. 2).

Exemplary implementations of optimizer 137 may operate on problems containing constraints. These constraints may be evaluated using elements and/or functionality of optimizer 137. For example, these elements can include, but are not restricted to, evaluation logic 310, interface logic 320, mapping logic 330, and/or filter logic 340.

Exemplary implementations, described hereinbelow, may include optimization problems employing table gradient constraints to constrain the inter-cell gradients of a quantity defined on a look-up table.

Exemplary Table

Figure 4A:
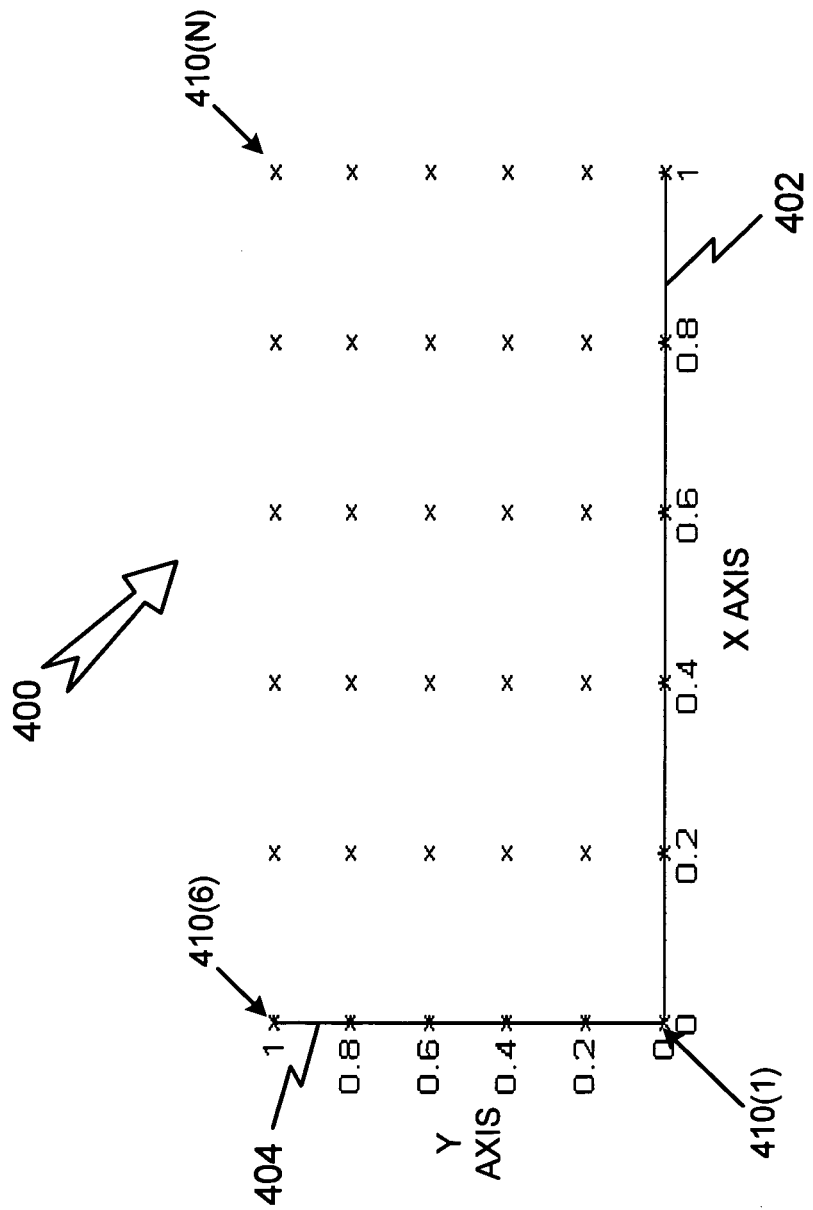
FIG. 4A illustrates an exemplary lookup table that can be used with an exemplary implementation.

FIG. 4A illustrates an exemplary lookup table that can be used to store values. Lookup table 400 may be implemented as a 2 dimensional (2D) lookup table having an x-axis 402 and a y-axis 404. X-axis 402 and y-axis 404 may have units/dimensions or may be dimensionless depending on a configuration of lookup table 400. Lookup table 400 may include a number of cells or grid points, such as grid points 410(1), 410(6) to 410(N) (collectively grid points 410). Grid points 410 may represent known locations within lookup table 400, such as locations where values stored in lookup table 400 can be accessed. Lookup table 400 may include references, such as coordinates, that can be used to identify specific grid points 410. Exemplary implementations may rotate coordinates associated with lookup table 400 so as to facilitate performing operations on points in table 400.

In one implementation, lookup table 400 may be identified and may include grid points, t, $$t = [t_1, t_2, \ldots, t_N], t_i \in \mathfrak{R}^d \qquad \text{(EQ. 1)}$$

where d can represent the dimension of lookup table 400. The implementation of lookup table 400 in FIG. 4A is a 2D lookup table; however, implementations of lookup tables that can be used with disclosed techniques are not limited to tables of a certain dimension. For example, other implementations of lookup tables used with disclosed techniques can operate with lookup tables having more than two dimensions, such as three, four, or more dimensions. Alternatively, disclosed techniques and/or hardware implementations can operate on information related to a number of one dimensional lookup tables and may process the information using techniques applicable to lookup tables having more than one dimension.

In one exemplary implementation, lookup table 400 may include quantities that can be defined on the grid points of EQ. 1. For example, s can be a quantity defined on the grid points of lookup table 400, where $$s^t = [s_1^t, s_2^t, \ldots, s_N^t] \qquad \text{(EQ. 2)}$$

Exemplary implementations may use a lookup table, for example as shown in FIG. 4A, or may use other types of storage structures, such as other types of tables. For example, in an implementation, a table having cells may be used.

Figure 4B:
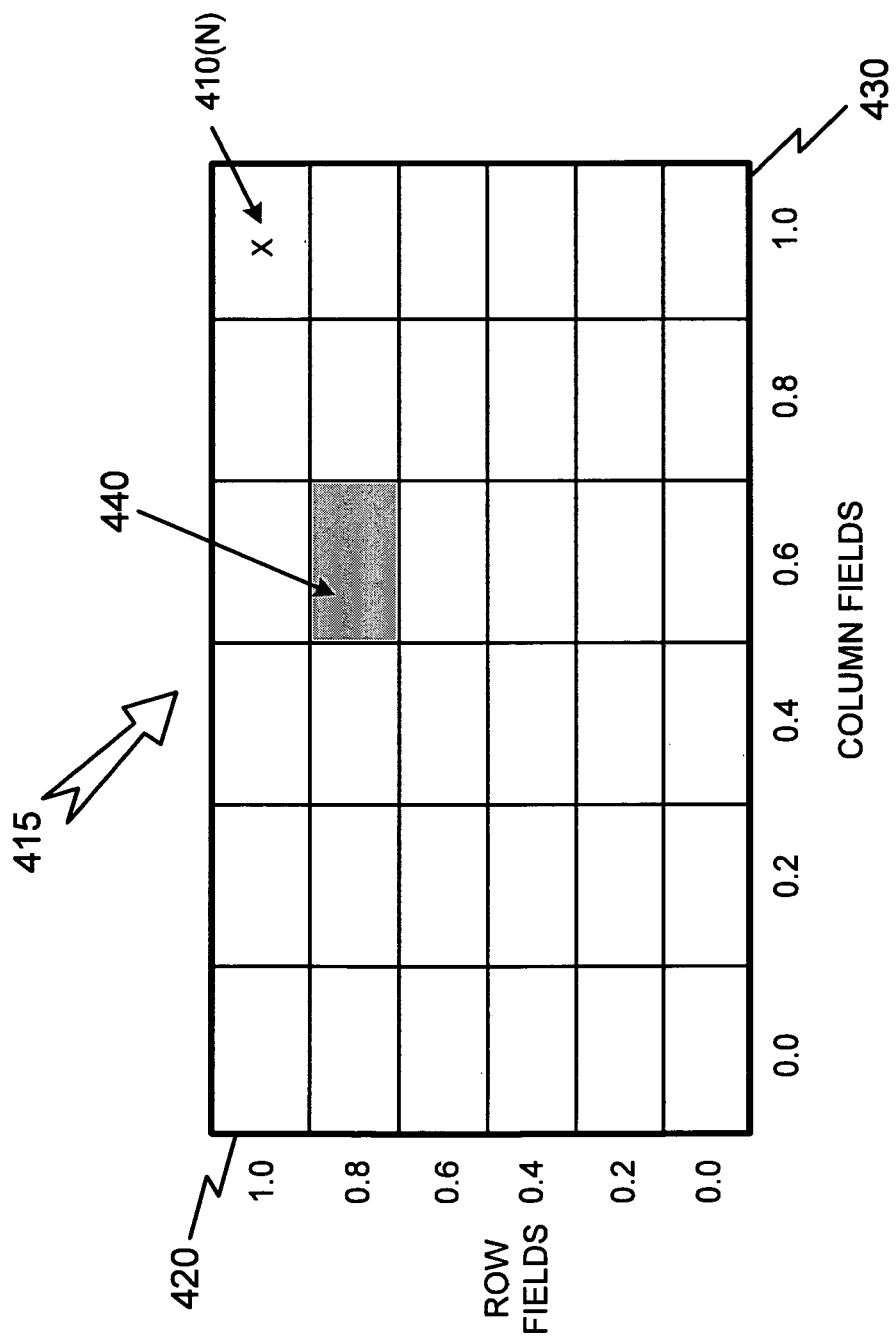
FIG. 4B illustrates an alternative implementation of a table that can be used with an exemplary implementation.

FIG. 4B illustrates an alternative implementation of a lookup table that can be used with an exemplary implementation. Table 415 may include a storage structure that includes one or more rows and columns, where intersections of the rows and columns form cells that can be used to store information. For example, in one implementation, table 415 can be implemented via a spreadsheet (e.g., a Microsoft Excel spreadsheet, etc.) that may include cells, or other storage locations, that can be identified using identifiers. Examples of identifiers may include, but are not limited to, row identifiers, column identifiers, cell identifiers (e.g., cell numbers), etc.

In the embodiment of FIG. 4B, table 415 may include row fields 420 and column fields 430. Row fields 420 and/or column fields 430 may include information that can be used to identify one or more cells 440 in table 415. For example, row fields 420 and/or column fields 430 may include numbers, letters, symbols, etc., that can be used to identify or reference a row and/or column in table 415. In one implementation, cell 440 may be referenced using a nomenclature, such as (row field, column field) that can be represented as, for example, (0.8, 0.6) to reference cell 440.

Cell 440 may include a structure that can be used to store information in table 415. For example, cell 440 may, store a point, a quantity associated with a point (e.g., a mapped quantity associated with a point) and/or other types of information. In one embodiment, table 415 may include grid points (e.g., grid point 410(N)). Cell 440 may be identifiable so that information stored in cell 440 can be accessed and/or so that information can be stored in cell 440.

Implementations of cells 440 may be used with substantially any type of storage structure and therefore are not limited to types of tables, such as lookup tables. Table 415 may provide a convenient type of storage for storing quantities associated with calibration activities, such as activities related to calibrating engines and/or other types of applications, devices, or systems.

Exemplary embodiments of lookup tables, other types of tables, etc., may be used with many types of applications (e.g., software applications), in many types of environments (e.g., executable modeling environments, code generation environments, etc.), and/or with many types of languages (e.g., dynamically typed languages, array based languages, scripted languages, etc.). Therefore exemplary embodiments of storage structures (e.g., tables) are not limited to particular types of environments, applications, and/or languages.

Figure 5:
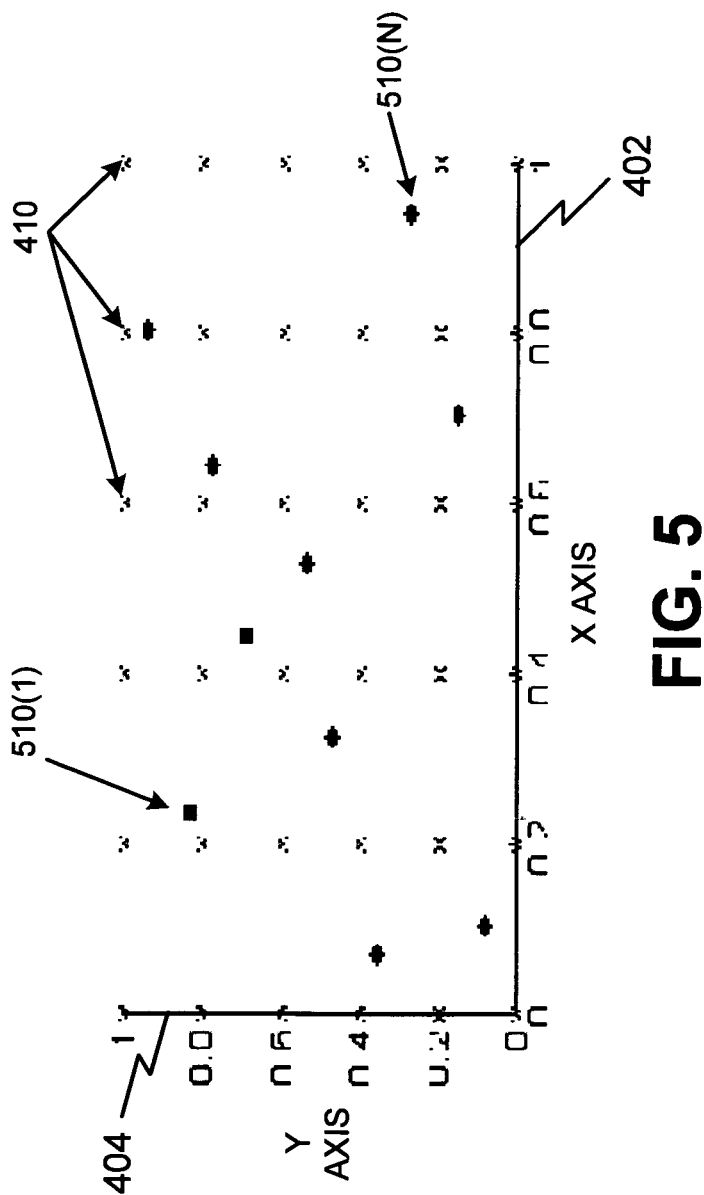
FIG. 5 illustrates the exemplary lookup table of FIG. 4A along with specified points at which an optimizer can be run.

FIG. 5 illustrates the exemplary lookup table of FIG. 4A including specified points, where the specified points are those points at which objective(s) will be optimized by the optimization algorithm. Specified points are identified as points 510(1) to 510(n) (collectively points 510) in FIG. 5. In one or more exemplary implementations, points 510 may not coincide with grid points 410, as indicated by points 510 not overlaying the "x's" for grid points 410 in FIG. 5.

Figure 6:
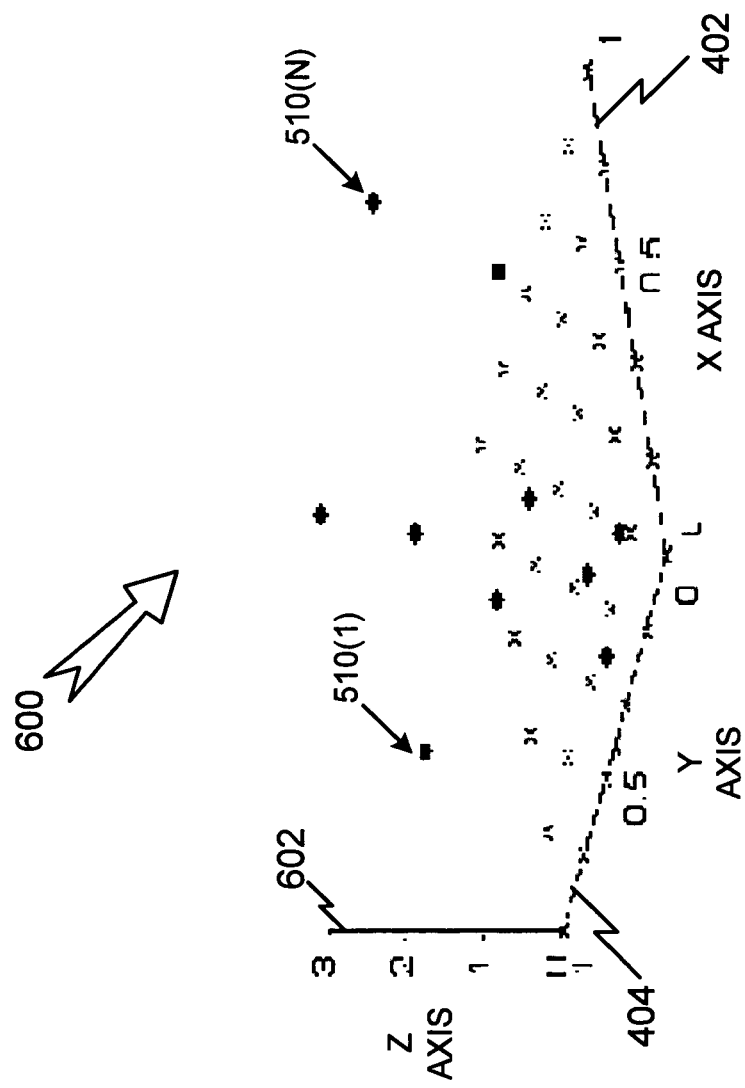
FIG. 6 illustrates the value of a quantity to be optimized, s, at specified points within an exemplary lookup table.

FIG. 6 illustrates the values of the quantity s at the specified points plotted against the lookup table axes. Lookup table 600 may include x-axis 402, y-axis 404, and z-axis 602 and may represent points 510 in relation to x, y, and z coordinates.

In the exemplary implementations of FIGS. 5 and 6, points 510 may cover substantially an entire x-y plane defined by the x and y axes. Implementations of the table gradient constraint techniques described herein may be applied to lookup tables that include points covering some or all of a plane determined by axes of the lookup table. Therefore, disclosed techniques are not limited to lookup table types (such as the number of dimensions of the lookup table), distribution of points within a lookup table, numbers of points within a lookup table, values/quantities associated with points in the lookup table, etc.

Exemplary implementations may employ table gradient constraints to constrain inter-cell gradients of $s^t$. Constraints on $s^t$ may be a bound on cell differences. In one exemplary implementation, a table gradient constraint may be cast as a linear constraint that can be represented as $$Ds^t \leq g \qquad (EQ. 3)$$

where $D(\in \Re^{nc \times N})$ is a difference operator, $g(\in \Re^{nc})$ is a bound on the inter-cell gradients of s' and nc is the number of constraints.

Exemplary implementations may allow users and/or devices to form table gradient constraints using points 510 that are not defined at grid points 410. For example, exemplary implementations may use techniques that create a linear mapping from one or more specified points to one or more corresponding points in a lookup table. Assume, for sake of example, that a linear mapping may be represented as $$s^t = Ls^p \qquad (EQ. 4)$$

where L is the linear mapping. In one exemplary implementation, linear regression techniques may be used to perform the desired linear mapping. Linear regression may involve fitting a model with linear coefficients to the quantity, $s^p$, at the specified points. This model may then be used to estimate $s^t$ at grid points 410 in lookup table 400 using EQ. 4. The general form for L in this case may be represented as $$L = X_t(X_p^T X_p)^{-1} X_p^T \qquad (EQ. 5)$$

In another exemplary implementation, interpolation techniques may be used to perform a desired linear mapping. For example, interpolation may involve identification of a model (which may be known as an interpolant in the relevant arts) that passes through values of $s^p$ at specified points 510. In one implementation, the model may pass exactly through values of s at specified grid points 510, and in another implementation, the model may pass near values of s at specified grid points 510. The interpolant may then be used to estimate $s^t$ at the points in lookup table 400 using EQ. 4. The general form for L in this case may be represented as $$L = X_t X_p^{-1} \qquad (EQ. 6)$$

In EQ. 5 and EQ. 6, $X_t$ is the $N_{tab}$ by $N_{term}$ matrix containing evaluation of the basis elements of the model/interpolant at the lookup table points, $N_{tab}$ is the number of points in the lookup table, and $N_{term}$ is the number of terms in the model used for the mapping. $X_p$ is the $N_{pts}$ by $N_{term}$ matrix containing evaluation of the basis elements of the model/interpolant at the specified points with $N_{pts}$ being the number of specified points.

In one exemplary implementation, a radial basis function (RBF) interpolant may be used to map a constrained quantity from locations where the quantity is defined (e.g., points 510) onto grid points 410. In this exemplary implementation, the constraint may be defined when s is a quantity defined at non-grid point locations, or points (herein referred to asp). In some implementations, $p_i$ may not be coincident with $t_i$ as defined in EQ. 1, above. In these implementations, $p_i$ can be represented as $$p = [p_1, p_2, \ldots, p_N], p_i \in \Re^d \qquad (EQ. 7)$$

and the value of s at these points, p, can be represented as $$s^p = [s_1^p, s_2^p, \ldots, s_N^p] \qquad (EQ. 8)$$

In an exemplary implementation, EQ. 3 (the table gradient constraint) requires that s be evaluated at grid points 410, namely at $s^t$. An estimate of these points may be obtained by using the RBF interpolant to map $s^p$ to $s^t$. In this exemplary implementation, the interpolant may be derived from $s^p$, namely $$X_p a = s^p \qquad (EQ. 9)$$

where $X_p$ is an interpolation matrix for the interpolant and a vector a contains the parameters of the RBF. The interpolant from EQ. 9 may be used to estimate $s^t$ from $s^p$, as shown below in EQ. 10

$$s^t = X_t a = X_t X_p^{-1} s^p \qquad (EQ. 10)$$

where $X_t$ is an evaluation of the interpolation matrix at grid points 410.

Figure 7:
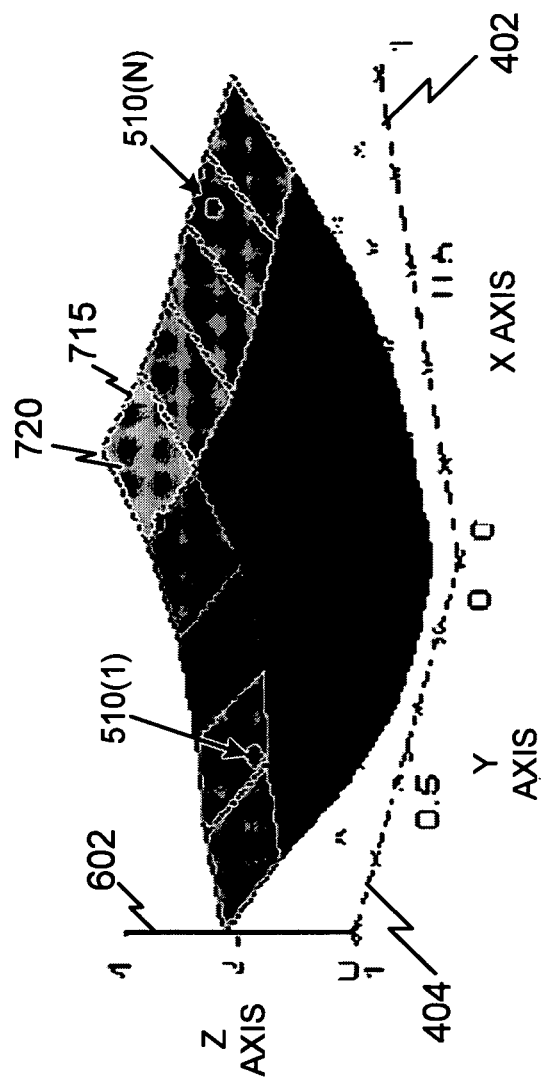
FIG. 7 illustrates an exemplary surface that can be drawn through the values of the quantity to be optimized at specified points s using interpolation techniques.

FIG. 7 illustrates an exemplary surface 715 that can be drawn through values of s at the specified points 510 using exemplary interpolation techniques. In one implementation, surface 715 may, result when interpolation is performed in two dimensions. Other surface types may result when interpolation is performed in three or more dimensions. Surface 715 may include regions 720 that are related to grid points 410 (e.g., four grid points 410 may, be used to form boundaries for region 720). In one exemplary implementation, surface 715 may pass through substantially all points 510. In other exemplary implementations, surface 715 may pass through a portion of points 510.

Figure 8:
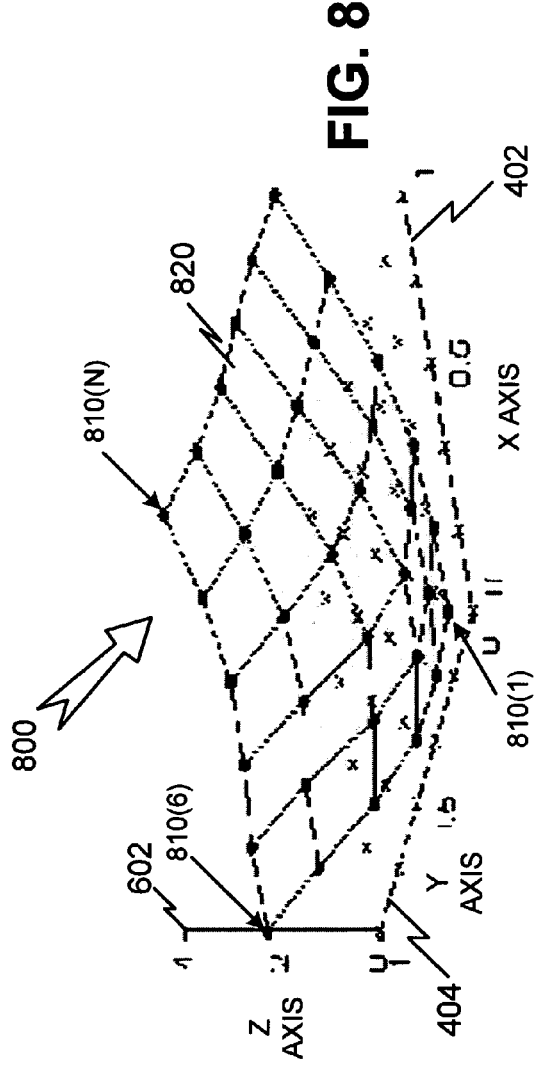
FIG. 8 illustrates an exemplary surface that can be used to estimate values of a quantity, s, at table grid points.
Figure 9:
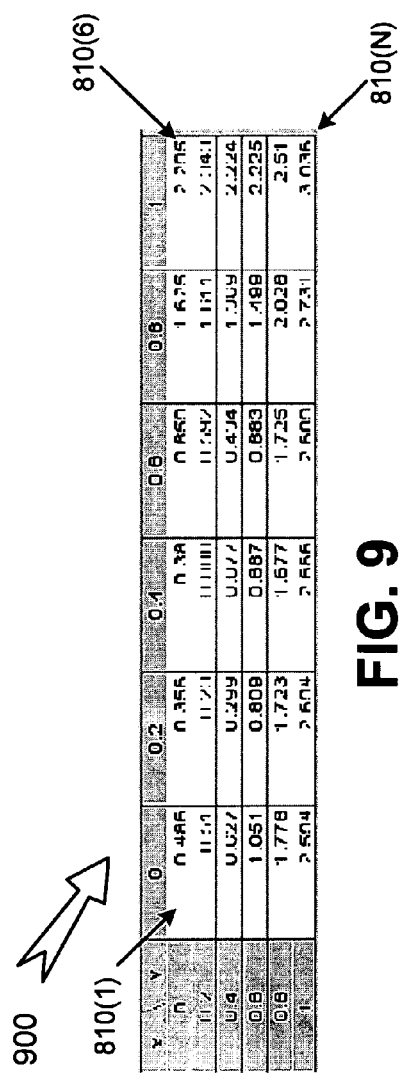
FIG. 9 illustrates an exemplary lookup table that can be used to store values related to information shown in FIG. 8.

FIG. 8 illustrates an exemplary surface 820 that can be used to estimate values of a quantity at table grid points 410. Surface 820 may include a number of interpolated points, such as interpolated points 810(1), 810(6), to 810(N) (collectively points 810) that represent values of s interpolated from points 510 at grid points 410. Exemplary implementations may present surface 715 and/or 820 in a graphical form (e.g., as a surface) or in other forms, such as a tabular form (such as is illustrated in FIG. 9). Exemplary implementations may further display the surfaces, as well as other information, to a user via a display device.

FIG. 9 illustrates an exemplary table 900 that can be used to store values related to information shown in FIG. 8. Table 900 may include row headings that identify x-axis 402 values and column headings that identify y-axis 404 values. Cells in table 900 may include values 810 (e.g., 810(1), 810(6), 810 (N), etc.) that identify an interpolated value on surface 820, where the interpolated value corresponds to a grid point 410.

Continuing further with the exemplary implementation, EQ. 10 may be fed into EQ. 3 and may produce a table gradient constraint where s is not defined at grid points 410 as shown below in EQ. 11

$$DX_t X_p^{-1} s^p \leq g \qquad (EQ. 11).$$

Inter-cell gradients may be calculated from information in table 900 (FIG. 9) in accordance with one or more exemplary implementations. For example, row gradients may be calculated for the first three rows of FIG. 9 (i.e., for x=0, 0.2, and 0.4) using the equations below.

$$g_{eval}(1)=(0.51-0.486)/0.2=0.12 \quad \text{(EQ. 12)}.$$

$$g_{eval}(2)=(0.627-0.51)/0.2=0.585 \quad \text{(EQ. 13)}.$$

$$g_{eval}(3)=(1.051-0.627)/0.2=2.12 \quad \text{(EQ. 14)}.$$

Quantities from EQs 12-14 may be related to a general form for the table gradient constraint presented in EQ. 11 as follows:
The first three rows of a difference matrix, D, can be given by $$D = \begin{pmatrix} \frac{-1}{0.2} & \frac{1}{0.2} & 0 & 0 & \ldots \\ 0 & \frac{-1}{0.2} & \frac{1}{0.2} & 0 & \ldots \\ 0 & 0 & \frac{-1}{0.2} & \frac{1}{0.2} & \ldots \end{pmatrix} \quad \text{(EQ. 15)}$$

$s^t$ is given by $$s^t = X_t X_p^{-1} s^p = \begin{pmatrix} 0.486 \\ 0.51 \\ 0.627 \\ 1.051 \end{pmatrix} \quad \text{(EQ. 16)}$$

Plugging D, $X_t$, $X_p^{-1}$ and $s^p$ into the left hand side of EQ. 11 returns $g_{eval}$. These returned values are then compared with the bound on each gradient (g in EQ. 11) to determine whether the constraint has been met.

Exemplary implementations of optimization techniques that can be applied to points in a lookup table, such as those illustrated in FIGS. 5-8, may perform one or more iterations on some or all of the points in the lookup table. Logic, such as evaluation logic 310, mapping logic 330, etc., may determine whether determined criteria, such as optimization, calibration, etc., criteria, have been met after an iteration is performed. Iterations may continue until the determined criteria is achieved or until another termination condition is encountered, such as reporting an error message, reaching an iteration limit, reaching a timeout limit, receiving a user command, etc.

Points 510 may cover a majority of the area, or space, making up the lookup tables, exemplified in FIGS. 5-8. Exemplary implementations of table gradient techniques disclosed herein are not limited to points 510 covering a majority of the space making up a lookup table and can be applied to lookup tables that do not include points 510 covering, for example, substantially an entire space (e.g., a plane) spanned by the lookup table.

Figure 10:
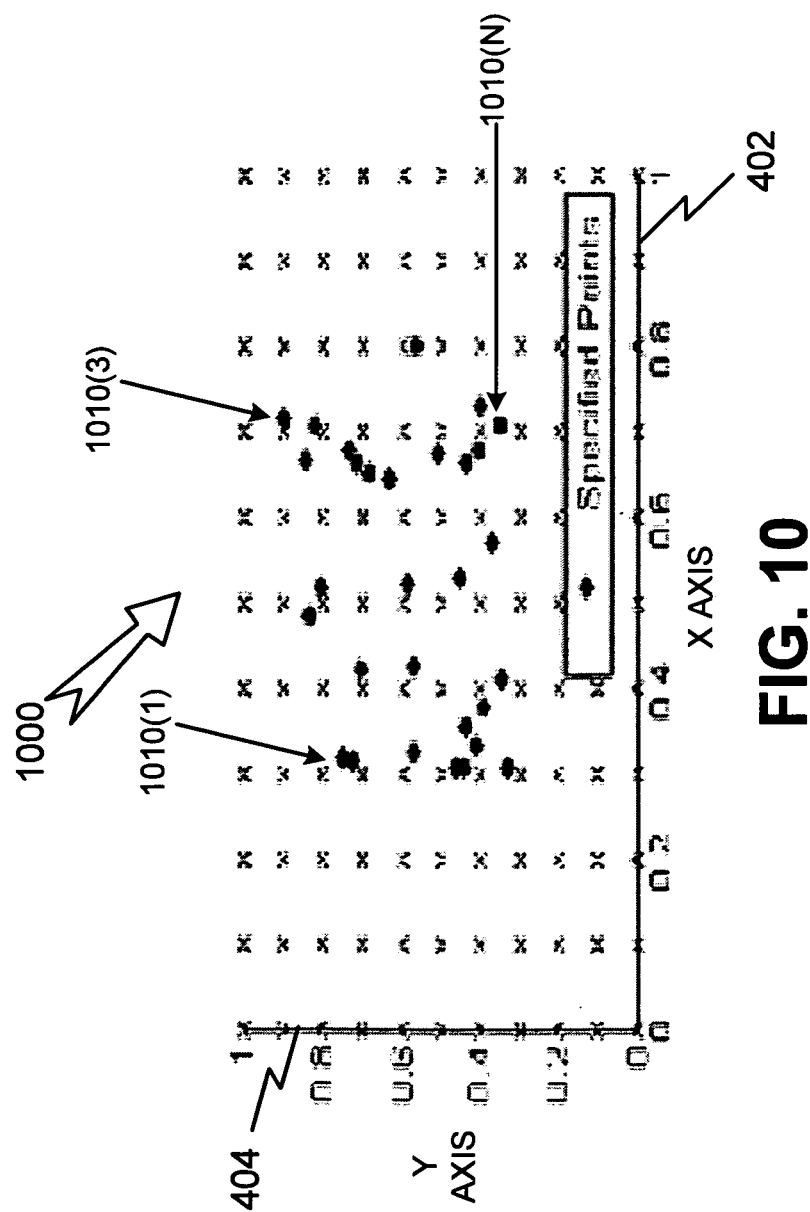
FIG. 10 illustrates an exemplary 2D lookup table that includes points related to a table gradient constraint.

FIG. 10 illustrates an exemplary 2D lookup table 1000 that includes points 1010 related to a table gradient constraint, where the points 1010(1)-1010(N) cover a portion of the space defined by lookup table 1000. For example, lookup table 1000 may span a space (e.g., an entire x-y plane) formed by the length of an x-axis 402 and a y-axis 404. In the example of FIG. 10, points 1010(1)-1010(N) (collectively points 1010) may not span the entire x-y plane or a substantial portion of the x-y plane.

With regard to FIG. 10, it may be desirable to restrict the table gradient constraint to acting only within a region of table 1000 that contains points 1010. For example, a calibration of table 1000 performed over the entire x-y plane may be less accurate than a calibration that is restricted to the region of table 1000 that contains data, namely points 1010. Exemplary techniques for restricting the table gradient constraint to active regions of a lookup table may include defining one or more boundaries within the lookup table using, for example, filter logic 340.

Figure 11:
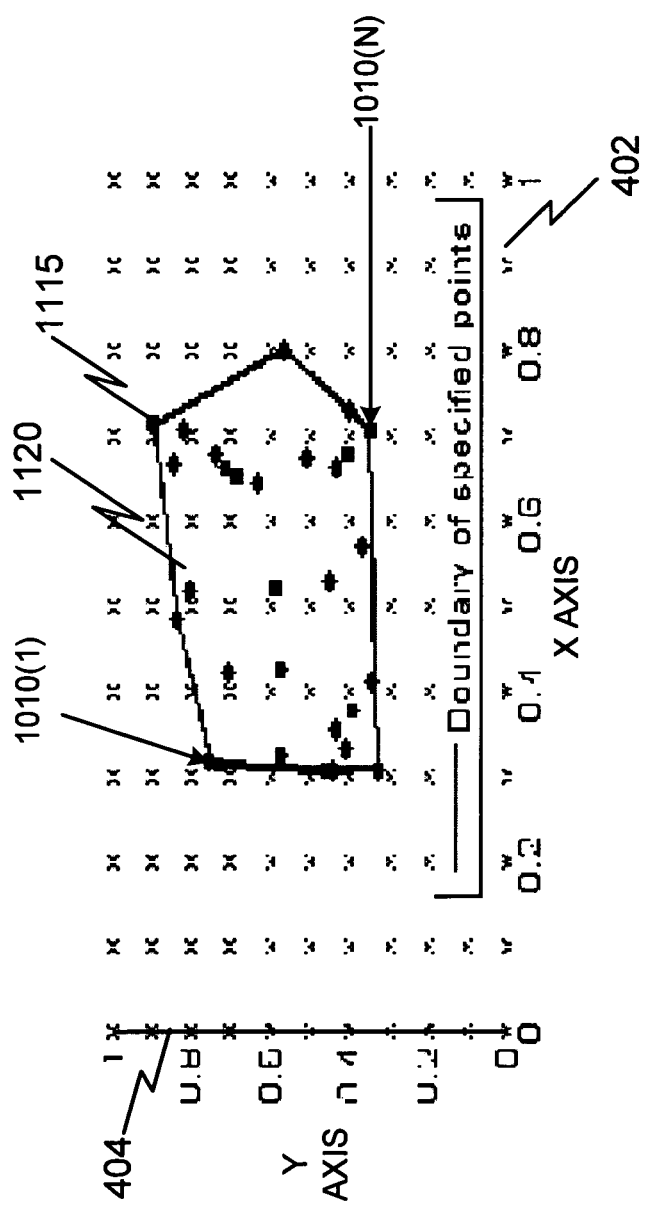
FIG. 11 illustrates an exemplary boundary that can be related to the specified points in the lookup table of FIG. 10.

FIG. 11 illustrates an exemplary boundary that can be related to points in lookup table 1000. A boundary 1115 may be defined using selected ones of points 1010, such as points defining an outer portion of a region occupied by points 1010. Boundary 1115 may define a region 1120 that includes substantially all points 1010. In one implementation, logic operating in server 130, such as filter logic 340, may identify a subset of points 1010 to use as boundary 1115.

Assume, for sake of example, that boundary 1115 may be formed using techniques that may include a set of planes, such as hyper-planes, that can encompass specified points. For example, the plane set may encompass all specified points or may encompass a subset of the specified points. In one implementation, a convex hull can be used to determine a function that encompasses all of the specified points. For example, given $s^p$ as a set of specified points and table axes of a lookup table as x1, x2, ... xN, a function B(x1, x2, ..., xN) can be found that encompasses all of the specified points. In this example, where boundary 1115 equals the boundary of the specified points, B(x1,x2, ..., xN)<0 for values of x1,x2, ..., xN inside boundary 1115     (EQ. 17).

B(x1,x2, ..., xN)=0 for values of x1,x2, ..., xN on boundary 1115     (EQ. 18).

B(x1,x2, ..., xN)>0 for values of x1,x2, ..., xN outside boundary 1115     (EQ. 19).

Techniques, other than the convex hull described above, can be used to determine a function that encloses the specified points. For example, RBF interpolation, support vector machines, etc., can be used.

In an alternative implementation, a user may select the subset of points 1010 using an input device, such as a pointing device. In still other implementations, the subset of points may be selected using still other devices, logic, and/or techniques. In one exemplary implementation, an active region may be defined, where the active region contains table cells that lie inside boundary 1115.

Figure 12A:
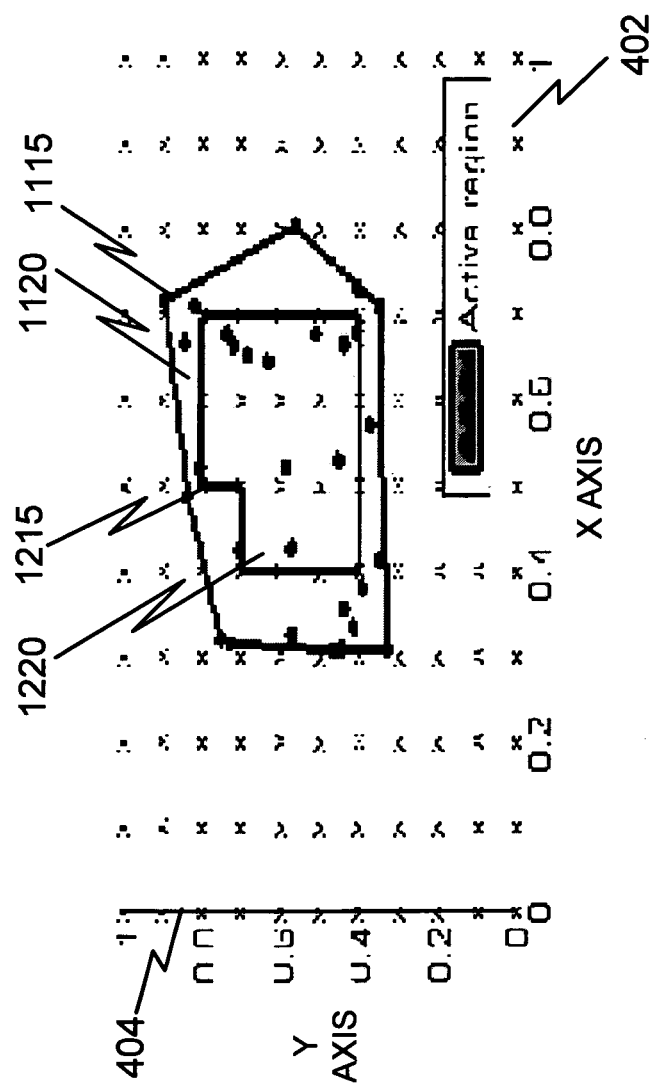
FIG. 12A illustrates an active region that can be defined within the boundary of FIG. 11.

FIG. 12A illustrates an active region 1220 that can be defined within boundary 1115. In the implementation of FIG. 12, active region 1220 can be defined using active boundary 1215. Exemplary implementations may determine active boundary 1215 and/or active region 1220 manually (e.g., via user input) and/or automatically (e.g., without requiring a user input). Active region 1220 may be operated on using a number of techniques. In one exemplary implementation, active region 1220 may be operated on by dilating or expanding active region 1220. For example, active region 1220 may be dilated to allow trust in the RBF interpolant a determined distance outside boundary 1115.

FIG. 12B illustrates exemplary processing for generating an active region 1220 as illustrated in FIG. 12A. Active boundary 1215 and/or active region 1220 may be determined and/or applied according to the processing of FIG. 12B. For example, points 510 may be identified in lookup table 400 (act 1240). In one exemplary implementation, points 510 may be identified to allow creation of active boundary 1215. The identified points may be selected so as to allow active boundary 1215 to encompass all points 510 in lookup table 400 or to allow active boundary 1215 to include a portion of points 510.

Active boundary 1215 may be created using the identified points (act 1250). Exemplary implementations may or may not display active boundary 1215 to a user. Exemplary implementations may further allow a user to modify active boundary 1215 using a pointing device, command line prompt, etc. For example, a user may adjust active boundary 1215 so as to include or exclude certain points 510.

Filter logic 340 may create a map, such as a Boolean map (B), that can be used to determine whether lookup table 400 grid points 410 are inside or outside active boundary 1215 (act 1260). Boolean maps, as used with exemplary embodiments, can take multiple forms. For example, in one implementation a Boolean map may be a Boolean table that may identify grid points 410 with a "1" when a respective grid point 410 lies within active boundary 1215. In contrast, the Boolean table may, identify a grid point with a "0" when the grid point 410 lies outside active region 1215. Other implementations of the Boolean map/table may represent grid points 410 using other techniques.

The Boolean map may be dilated to allow trust in the interpolant beyond active boundary 1215 (act 1270). For example, the dilated Boolean map may allow trust in the interpolant a determined distance (e.g., a short distance) beyond the boundaries of the un-dilated Boolean map. The region encompassed by the dilated Boolean map may correspond to active region 1220 and/or to another region, such as an expanded active region.

The dilated Boolean map may be used to create a Boolean vector, F, (act 1280). F can be used to indicate whether individual constraint gradients can be calculated. In one implementation, F can be used to indicate whether each individual constraint gradient can be calculated, and in other implementations, F can be used differently. In one exemplary implementation, F may act as the filter for the table gradient constraint. For example, the table gradient constraint of EQ. 8 may become $$F.*(DX_r X_p^{-1} s^p) \leq F.*g \qquad (EQ. 20)$$

using the constraint filter, where F is a nc-by-1 Boolean vector and ".*" indicates elementwise matrix multiplication.

Figure 13:
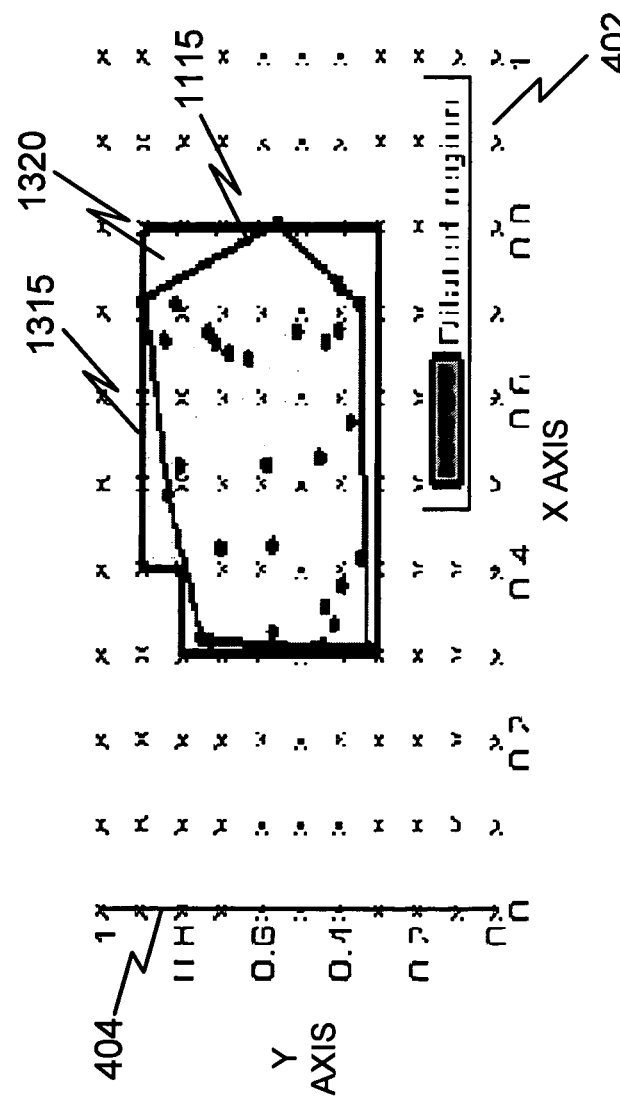
FIG. 13 illustrates a dilated boundary that can be used with a table gradient constraint.

FIG. 13 illustrates a dilated boundary 1315 that can be used with a lookup table. Dilated boundary 1315 may be formed using a number of techniques, such as morphological dilation using a 3-by-3 basis element (e.g., for 2D tables). Other implementations may use other techniques, such as techniques used in the image processing arts and/or other arts. Dilated boundary 1315 may enclose a dilated active region 1320 that can be used to compute table gradient constraints using points 1010 (FIG. 10).

ILLUSTRATIVE EXAMPLE

Implementations may be used to determine table gradient constraints for data used in a number of industries and/or for a number of applications. In one implementation, techniques described herein can be applied to data related to calibration efforts directed to automobile engines, systems that include engines, systems that operate with engines (e.g., fuel intake systems), etc.

For example, an engine may be used to produce torque to propel a vehicle along a roadway. An amount of torque produced by the engine may depend on a number of parameters, or inputs. In one exemplary implementation, the torque produced by the engine may depend on engine speed, engine load, and exhaust valve timing. Table 1 illustrates engine speed, engine load and exhaust valve timing along with other information related to these inputs.

TABLE 1

Inputs for an exemplary automobile engine

| Engine Input | Description |
|---|---|
| N | Engine Speed (related to vehicle speed) |
| L | Engine Load (related to gas pedal position) |
| EXH | Exhaust valve timing (when exhaust gases are expelled from the engine) |

Engine speed and engine load may define the road conditions for a vehicle that uses the engine. Values for exhaust valve timing may define a state of the engine.

Figure 14:
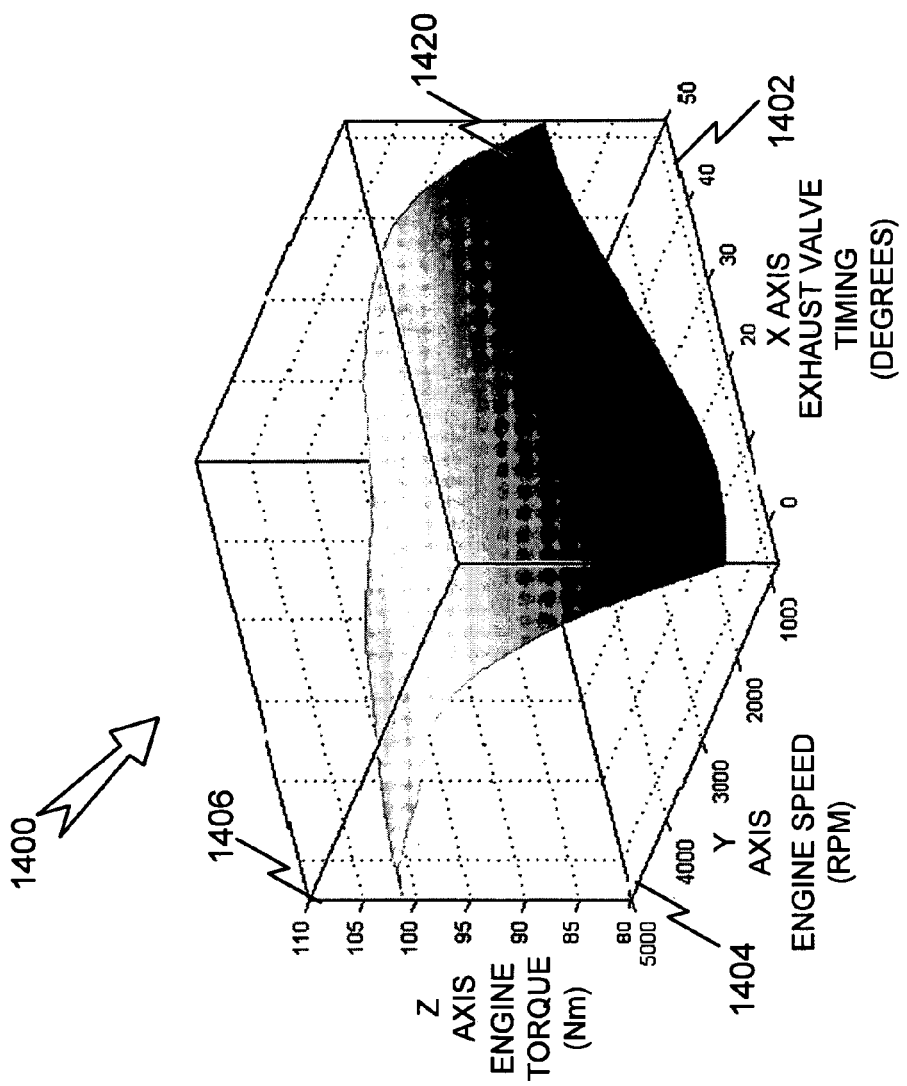
FIG. 14 illustrates an exemplary surface plot of torque for an exemplary engine.

FIG. 14 illustrates an exemplary surface plot of torque for an exemplary engine. For example, the surface plot of FIG. 14 may illustrate torque for the engine associated with Table. 1. FIG. 14 includes a 3-dimensional plot 1400 of torque for the example engine. Torque is plotted against an x-axis 1402 showing exhaust valve timing increments and a y-axis 1404 showing engine speed. The torque for the example engine may form a surface 1420 when plotted in three dimensions.

Automobile designers may wish to maximize the torque produced by the example engine with the exhaust valve timing restricted by a table gradient constraint. For example, designers may realize that exhaust valves may have excursion limits over which they can open, limits on the speed with which exhaust valves can move, an operating range over which acceptable engine performance is achieved, etc. Therefore, the designers may want to optimize engine performance while not exceeding certain ranges or parameters associated with parts of the engine, such as exhaust valves.

In the illustrative example, designers may wish to maximize the weighted sum of torque over four exemplary road conditions. For example, road conditions may be represented in terms of engine speed (N) which may be represented in units, such as revolutions per minute (RPM), and load (L), which may be a dimensionless quantity. The four road conditions of the illustrative example may be the quantities contained in Table 2.

TABLE 2

Road Conditions For An Engine Optimization

| N (RPM) | L (dimensionless) |
|---|---|
| 2400 | 0.4 |
| 2800 | 0.5 |
| 3200 | 0.5 |
| 3600 | 0.4 |

As previously discussed, exhaust valve timing (EXH) may need to be constrained over a range of values for engine speed (N) and engine load (L). For example, in the illustrative example, exhaust valve timing (EXH) may be constrained as shown in Table 3.

TABLE 3

Values Over Which EXH Is Constrained

| L/N | 2000 RPM | 3000 RPM | 4000 RPM |
|---|---|---|---|
| 0.3 | $E_{tab}(1)$ | $E_{tab}(3)$ | $E_{tab}(5)$ |
| 0.6 | $E_{tab}(2)$ | $E_{tab}(4)$ | $E_{tab}(6)$ |

A cost function may be defined for the engine optimization, where SUMTQ may represent the cost function. In the illustrative example, SUMTQ may be represented as $$SUMTQ=TQ(2400,0.4,EXH_1)+TQ(2800,0.5,EXH_2)+\\TQ(3200,0.5, EXH_3)+TQ(3600,0.4, EXH_4) \quad (EQ. 21)$$

During optimization, it may be desirable to constrain the inter-cell gradient of EXH in Table 3, above. For example, a horizontal inter-cell gradient for Table 3 may be represented as $$g_h=(E_{tab}(3)-E_{tab}(1)/1000) \quad (EQ. 22)$$

and a vertical inter-cell gradient may be represented as $$g_v=(E_{tab}(6)-E_{tab}(5)/0.3) \quad (EQ. 23)$$

In the illustrative example, designers may not want the horizontal inter-cell gradient to be greater than 5/1000 (which equals 0.005) or the vertical difference between the cells to be greater than 12/0.3 (which equals 40). In the illustrative example, exhaust valve timing, EXH, is constrained such that the inter-cell gradient of EXH over Table 3 are restricted. This restriction may be achieved in the illustrative example by calculating the inter-cell gradients of EXH at each iteration of the optimization algorithm. Since the optimization algorithm does not have data at N and L values defined in Table 3, techniques that require data to be defined at table cells (or grid points) may not work when applied to the problem identified in the illustrative example. In contrast, optimization techniques as described and illustrated hereinabove can be used to perform optimizations when data are defined at locations that do not correspond to table cells or grid points.

In one implementation, the optimization algorithm may operate on the data of Table 2 and may perform a number of iterations. For example, the algorithm may perform iterations until a maximizer is found, until differences between successive iterations reach some value, until a determined number of iterations are executed, until a certain execution time value is reached, etc. For purposes of the illustrative example, the optimization algorithm may be paused at a third iteration. The optimization algorithm may return the following values of EXH when paused

TABLE 4

Values of EXH At Iteration 3 Of An Exemplary Optimization Algorithm

| N | L | EXH |
|---|---|---|
| 2400 | 0.4 | 22.6984 |
| 2800 | 0.5 | 21.7725 |
| 3200 | 0.5 | 21.4916 |
| 3600 | 0.4 | 20.3371 |

The value of EXH from Table 4 may be mapped onto the grid specified in Table 3, above, by fitting a function, such as an RBF, through the values of EXH as a function of N and L. Use of the RBF interpolant may produce a surface, such as the surface illustrated in the surface plot of FIG. 15.

Figure 15:
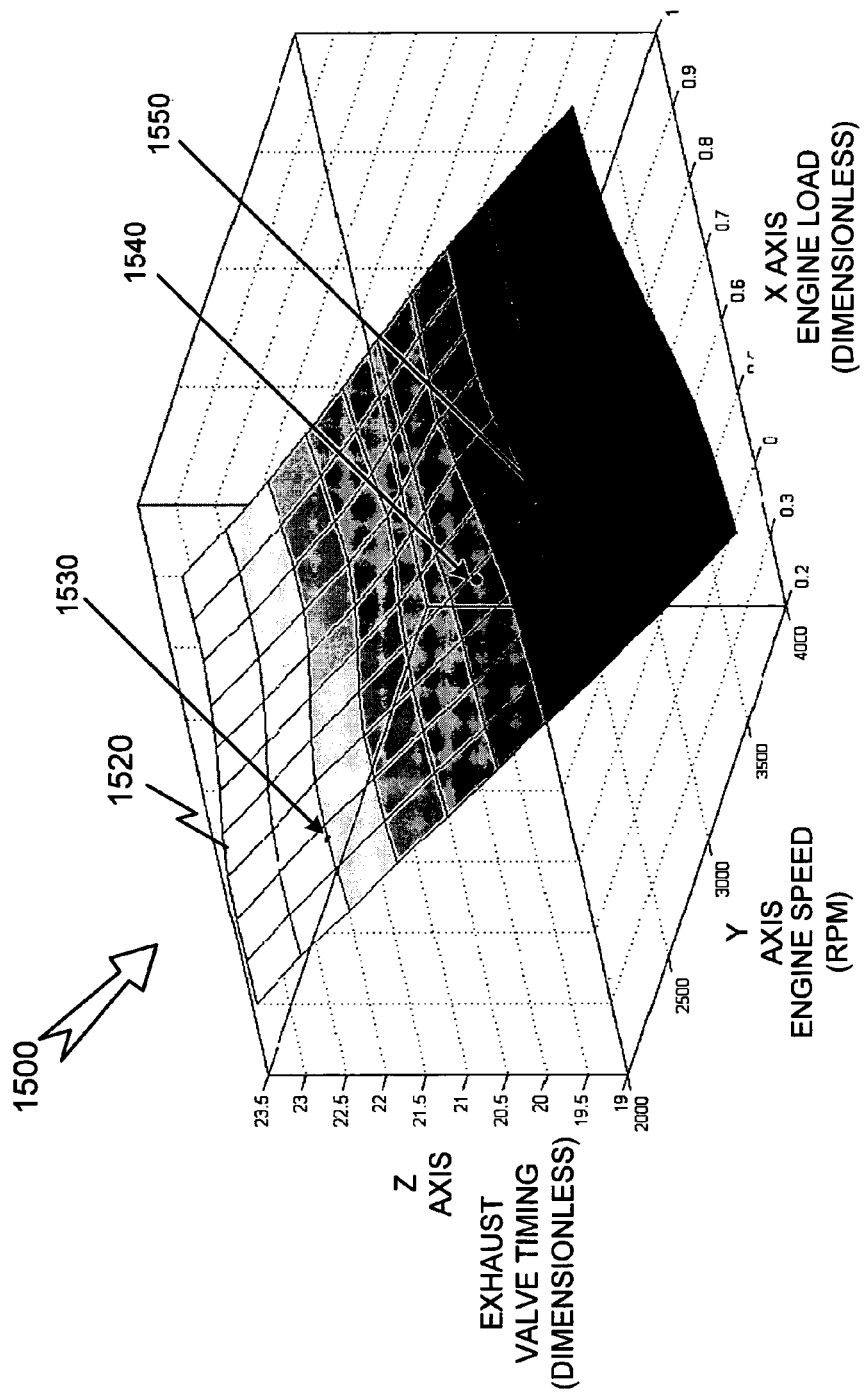
FIG. 15 illustrates an exemplary surface that represents a radial basis function interpolation through values representing exhaust valve timing for an exemplary engine.

FIG. 15 illustrates a plot 1500 showing an exemplary surface plot 1520 that represents the radial basis function applied to values of EXH. Surface plot 1520 may include values for EXH (shown as values 1530, 1540, and 1550) that are determined via the optimization.

The RBF interpolant may be evaluated at (N,L) points that are defined in Table 3., above, and may produce the following:

TABLE 5

Evaluation Of The RBF Interpolant Over Table 3.

| L/N | 2000 RPM | 3000 RPM | 4000 RPM |
|---|---|---|---|
| 0.3 | 23.4302 | 21.4284 | 19.4265 |
| 0.6 | 23.1317 | 21.6964 | 20.2611 |

Pairwise horizontal and vertical gradients may be calculated using Table 5 and may be returned to optimizer 137. For example, in one implementation, each pairwise horizontal and vertical gradient may be returned to optimizer 137. In another implementation, only selected pairwise horizontal or vertical gradients may be returned to optimizer 137.

Figure 16:
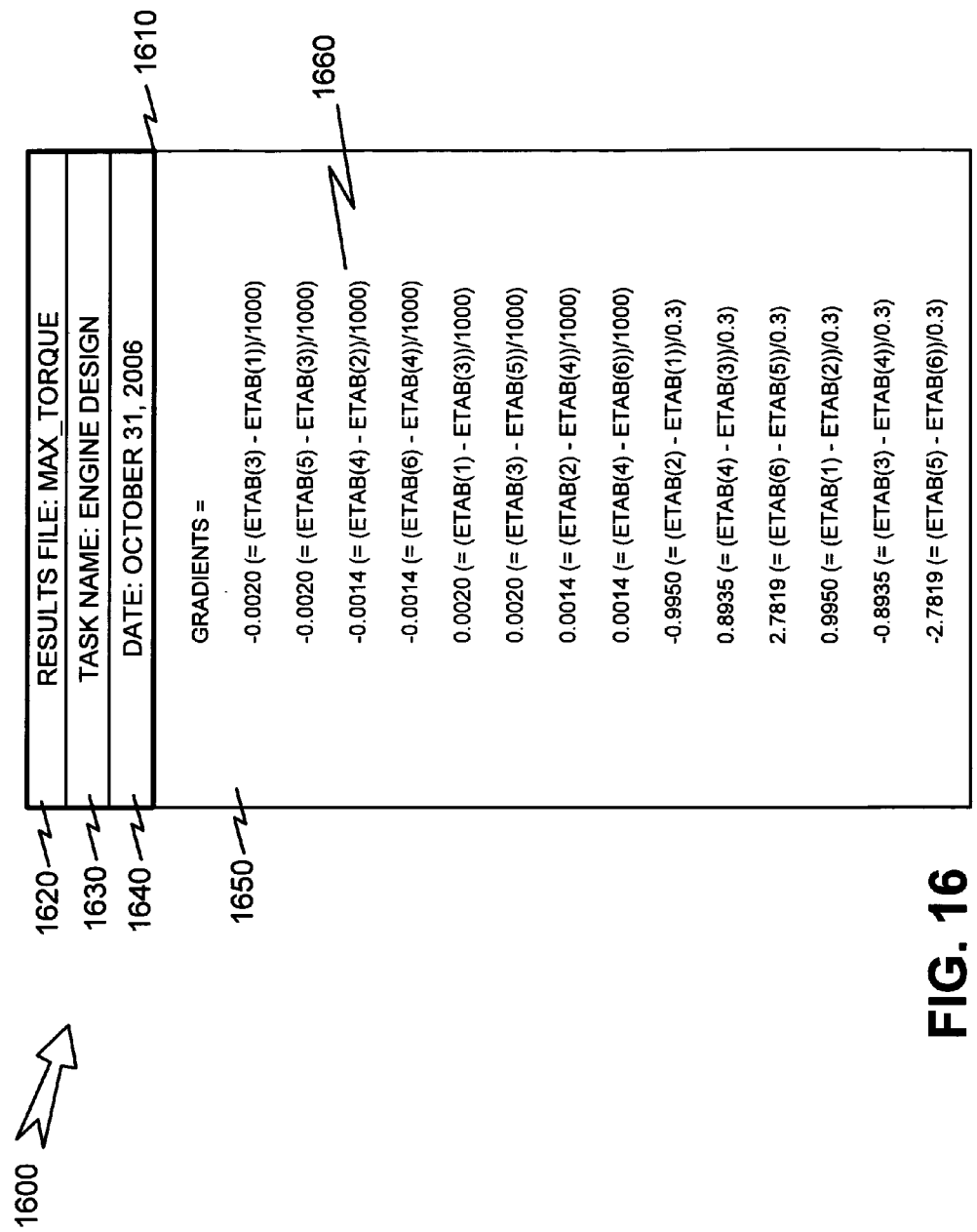
FIG. 16 illustrates an exemplary data structure that can include gradients related to the exemplary engine of FIG. 15.

FIG. 16 illustrates an exemplary data structure that can include horizontal and/or vertical pairwise gradients related to the exemplary engine. FIG. 16 illustrates a data structure 1600 that can include a header portion 1610 and a body portion 1650. Header portion 1610 may include results file 1620, task name 1630 and date 1640. Results file 1620 may include information, such as a file name, file path, link, etc., that identifies a file that includes information related to gradients. Task name 1630 may include information that identifies a task, job, etc., that is related to gradient information in body portion 1650. Date 1640 may include information identifying a creation, modification, etc., date and/or time related to data structure 1600. Body portion 1650 may include information related to gradients, such as data 1660.

In one implementation, data structure 1600 may include results related to horizontal and/or vertical pairwise gradients related to the exemplary engine. Exemplary implementations of data structure 1600 can be stored in storage device 250 and can take many forms, e.g., a file, a table, etc. Optimizer 137 may determine optimal settings for EXH after performing a determined number of iterations. For example, optimizer 137 may produce the following

TABLE 6

Optimal Settings For Exhaust Valve Timing, EXH

| N | L | EXH |
|---|---|---|
| 2400 | 0.4 | 18.906 |
| 2800 | 0.5 | 12.906 |
| 3200 | 0.5 | 10.906 |
| 3600 | 0.4 | 12.906 |

Optimal settings, such as those illustrated in Table. 6, may be mapped onto Table 5 using techniques discussed hereinabove. Mapping the settings onto Table 5 may produce a calibrated table that can represent a final result of the engine optimization. An example, of a calibrated table may be represented as

TABLE 7

Optimized Results For EXH Mapped Onto Table 5 (i.e., a table to be calibrated).

| L/N | 2000 RPM | 3000 RPM | 4000 RPM |
|---|---|---|---|
| 0.3 | 24.906 | 19.906 | 14.906 |
| 0.6 | 12.906 | 7.906 | 2.906 |

From Table 7, it can be seen that the horizontal inter-cell gradient does not exceed 5/1000 (=0.005) and that the vertical inter-cell gradient does not exceed 12/0.3 (=40) as required by the determined criteria.

The illustrative example described in connection with FIGS. 14-16 may be practiced in a number of environments using a computing device. For example, text based environments (e.g., a text based modeling environment, a text based programming environment, etc.), graphical environments (e.g., graphical modeling environments, graphical programming environments, etc.) and/or other types of environments known to those of skill in the relevant arts may be used. Other implementations may include data plotted in more than three dimensions and/or tabular data presented in more than two dimensions.

Exemplary Processing

Figure 17:
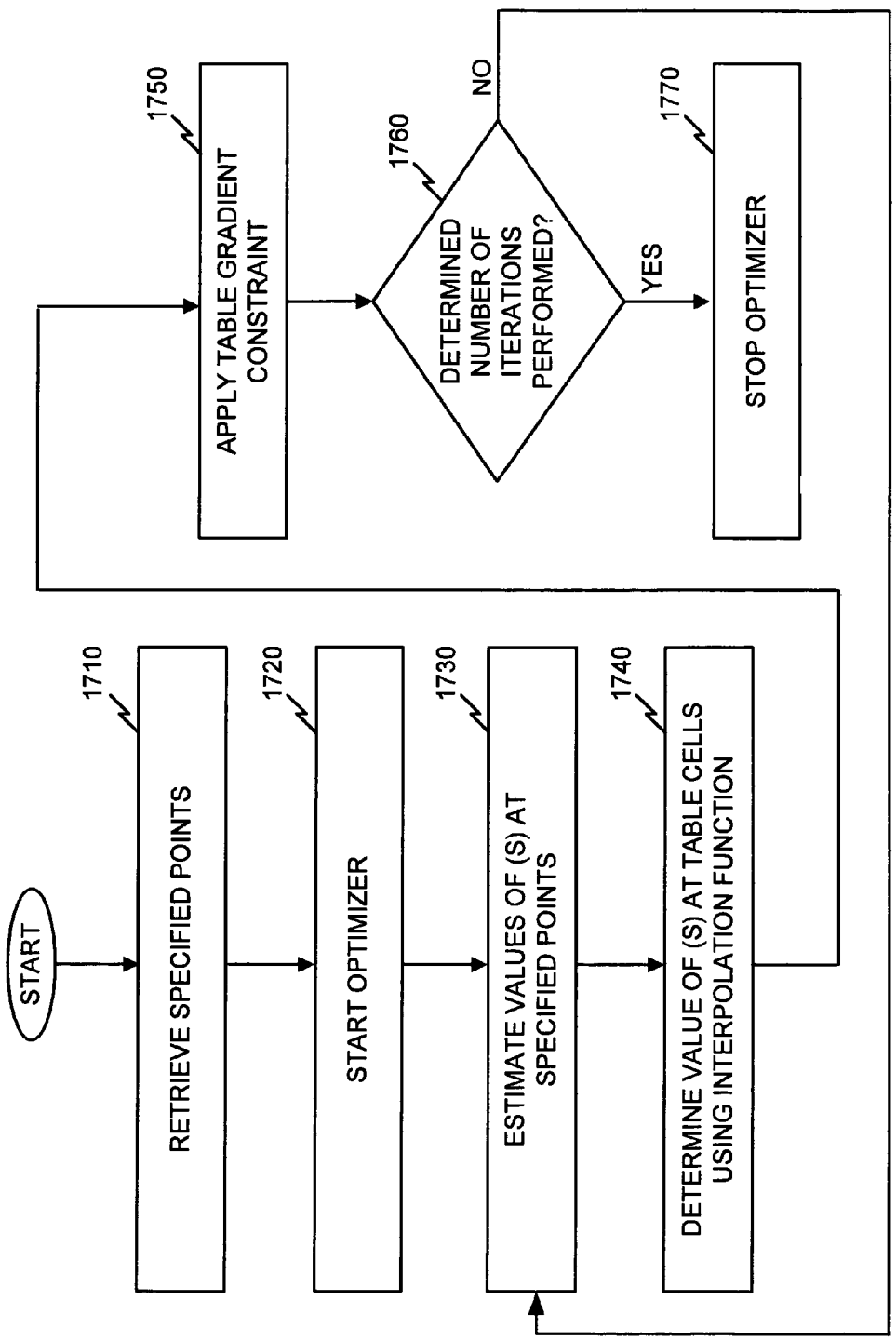
FIG. 17 illustrates processing acts related to an exemplary implementation.

FIG. 17 illustrates exemplary processing that can be performed to run an optimizer that utilizes a table gradient constraint calculated from data evaluated at points that may not coincide with lookup table grid locations/cells. The data at the specified points may be retrieved (e.g., from a storage device) (act 1710). For example, a number of points 510 representing measured data for DUT 140 may be stored in a text file. The stored points may not correspond to lookup table grid points, such as grid points 410.

An optimizer may be started (act 1720). For example, optimizer 137 may be started in server 130 or elsewhere in system 100. Optimizer 137 may initiate exemplary techniques that can be used to estimate values of a quantity at specified points, e.g., points 510, (act 1730).

Values for a quantity, s, at specified points, e.g., points 510, may be estimated by an optimizer (act 1730), and values of s may be determined at grid points 410 using an interpolation function (act 1740). Interpolation functions may be applied to the values of s at specified points when a surface has been fitted therethrough, such as a surface fitted through points 510.

Interpolation functions may allow values to be determined on the surface at locations corresponding to grid points 410. Alternative implementations may use other techniques, such as linear regression techniques, to determine values for s at grid points 410. For example, a RBF, thin plate spline, etc., may be applied to points 510 to form a surface passing through substantially all the values of a quantity at points 510. Exemplary implementations may use all points 510 when forming a surface, or may use a portion of points 510, such as when points 510 span a portion of a lookup table. For example, filtering (as described in connection with FIGS. 11-13) may be applied to points 510 when points 510 span a portion of a lookup table. The resulting surface is used to determine the values of the quantity at grid points 410.

Values for table gradient constraints may be applied (act 1750). For example, measured data, modeled/simulated data, and/or user specified data may be used to determine values for table gradient constraints. In one exemplary implementation, table gradient constraints may be selected to provide smooth transitions across a performance envelope for a device or system, such as an engine.

Optimization techniques implemented in optimizer 137 may perform a number of iterations on quantities evaluated at specified points. For example, an optimization algorithm may perform iterations until the maximum of some objective is achieved subject to differences between pairwise values evaluated at lookup table points 410 being less than or equal to table gradient constraint bounds (e.g., in a 2D lookup table, horizontal and/or vertical table gradient constraint values may be determined during iterations of the optimization algorithm).

In one exemplary implementation, optimizer 137 may be configured to run for a determined number of iterations. Logic operating in server 130 may determine whether the determined number of iterations have been performed by optimizer 137 (act 1760). Optimizer 137 may stop when the determined number of iterations have been performed (act 1770). Alternatively, when the determined number of iterations are not performed, the exemplary implementation of FIG. 17 may return to act 1730 and may again estimate values of s at the specified points.

Exemplary implementations may provide results to a user, a file or other type of computer-readable medium, a device, a network, etc. For example, server 130 may display a surface and/or table to a user for each iteration of the optimization algorithm to allow the user to observe how the optimization algorithm converges to a desired result. Alternatively, results may be stored in a data structure in storage device 250 or elsewhere in system 100. Information in a calibrated lookup table may be sent to a device, such as a field programmable gate array (FPGA), an application specific integrated circuit (ASIC), etc., for use in a target application, such as a control application.

Exemplary Data Structure

Figure 18:
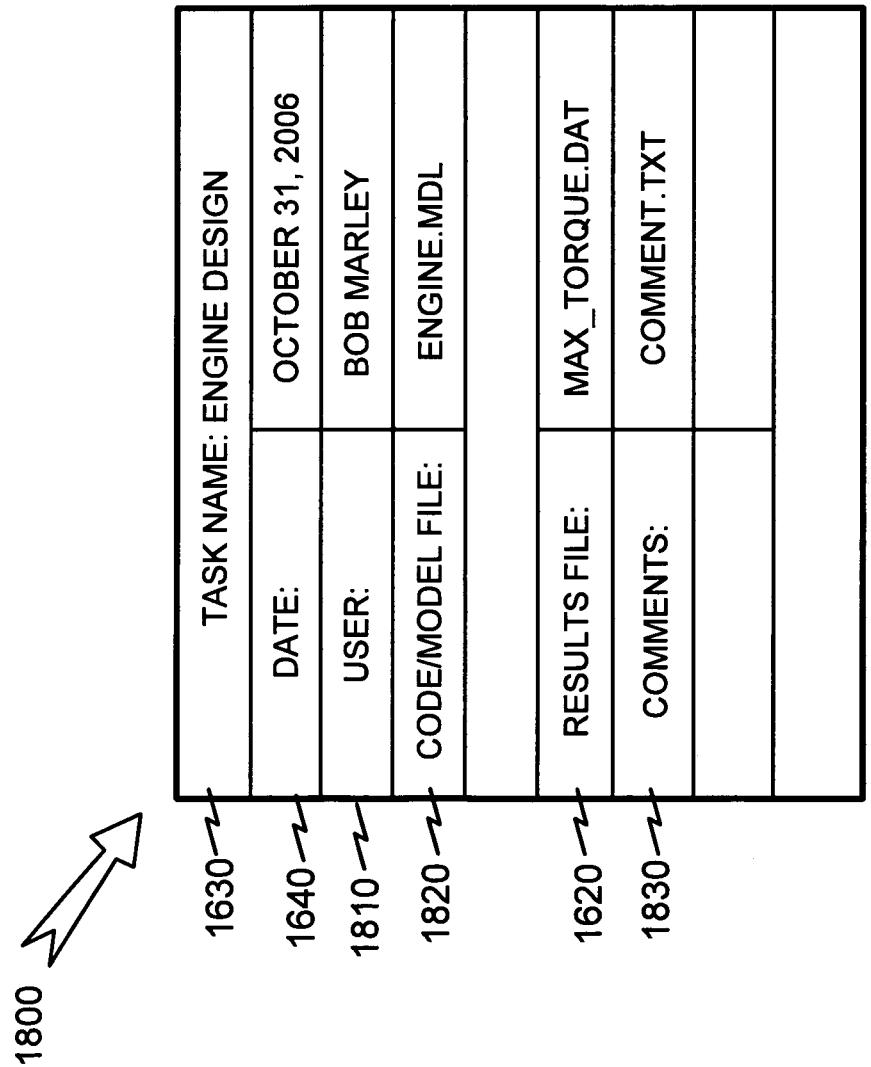
FIG. 18 illustrates an exemplary data structure that can be used to store information related to lookup tables.

FIG. 18 illustrates an exemplary data structure 1800 that can be used to store information related to optimization activities. Data structure 1800 may be implemented via a computer-readable medium that can be used to store information in a machine-readable format. Exemplary implementations may use substantially any number of data structures 1800 to store information related to optimizer 137. Implementations of data structure 1800 may be populated via an operator or a device in system 100 (FIG. 1). Alternatively, information in data structure 1800 can be obtained from a device not shown in system 100.

In one implementation, data structure 1800 may include information arranged in a row and column format to facilitate interpretation by users of client 110 or server 130 and/or by other logic, such as model 135, optimizer 137, or a target device. Other implementations of data structure 1800 may be configured in other ways.

Data structure 1800 may include results file 1620, task name 1630, date 1640, user 1810, code/model file 1820, and comments 1830. Results file 1620, task name 1630, and date 1640 may be implemented as described in connection with FIG. 16. User 1810 may include information that identifies a user related to a device in system 100, or an application, such as a modeling application, an optimization application, etc.

Code/model file 1820 may include information related to a file that contains code (e.g., software instructions), data (e.g., measured or simulated data for optimizer 137), etc., that can be used with model 135 or optimizer 137. Comments 1830 may include information related to model 135 or optimizer 137. For example, comments 1830 may include information about a testing configuration used to obtain data about an engine whose performance is being optimized.

Exemplary Application Program Interface

FIG. 19A illustrates an exemplary application program interface that can be used with exemplary embodiments described herein. API 1900 may include a code-based interface that can be embodied on a computer readable medium that includes instructions executable by a processing device to perform one or more functions and/or operations. For example, API 1900 may include information that allows interface logic 320 to send optimization related information to a receiving application and/or device or that allows interface logic 320 to receive optimization related information from a sending device, application, etc. API 1900 may be adaptable to allow optimizer 137 to communicate with substantially any type of device and/or application using substantially any, format or protocol, such as a communication protocol.

API 1900 may include one or more API property names and may include API property information in field 1910. API property name may include information identifying a name for a property used in system 100 for performing table gradient constraint related operations. API property information may include a description for an API property.

API 1900 may include one or more API function names and API function descriptions in field 1920. An API function name may include information identifying a function that can be used in system 100 when applying table gradient constraints to points in a table. API function description may include a description associated with an API function name.

FIG. 19B illustrates an exemplary data structure that defines properties conforming to API 1900. For example, data structure 1955 may include a property name field 1960 and a property information field 1970. Property name field 1960 may include information that identifies one or more properties that can be used by functions defined in API 1900. Property information field 1970 may include information that describes a property in property name field 1960, describes how to use a property identified in property name field 1960, etc. Information in property information field 1970 may be configured to allow optimizer 137 to evaluate a specific table gradient constraint.

FIGS. 19C-19F illustrates exemplary execution methods that conform to API 1900. Information regarding the API for these execution methods can be stored in substantially any type of computer readable medium, such as a file stored in a memory. For example, function definition 1956 may include a function prototype field 1961 and a field containing a description of the function 1971 (hereinafter information field 1971). The function prototype 1961 may include information that identifies one or more prototypes for a given method. Information field 1971 may include information that describes and/or identifies the function prototype 1961.

FIG. 19G illustrates exemplary private execution methods that can conform to API 1900. Information regarding these private execution methods can be stored in substantially any type of computer readable medium. For example, function definition 1957 may include a function prototype field 1962 and an information field 1972. Function prototype field 1962 may include information that identifies one or more private execution methods that conform to API 1900. Information field 1972 may include information describing a function identified by function prototype field 1962.

Generic Application Program Interface

FIG. 19H illustrates an exemplary API 1981 that can include an input portion 1982 and an output portion 1983. In one implementation, API 1981 may be used to operate with points that are not filtered. Input portion 1982 may include name 1963 and information 1973. Name 1963 may include identifiers about functions, files, variables, etc., that can be used to make data and/or information available to portions of system 100 via API 1981. In one implementation, name may include "definitionData" and "tableAxisEvaluationPoints." Information 1973 may include descriptions of the identifiers in name 1963.

Output portion 1983 may include information identifying functions, files, variables, etc., that are used by API 1981 to make information available to another device or piece of software (e.g., an object). In one implementation, output portion 1983 may include name 1963 and information 1973. For example, output portion 1983 may include "constraintFunction."

In one implementation, API 1981 may be used with a technical computing language, such as MATLAB technical computing software, and a general source code command related to API 1981 may be represented as:

constraintFunction=createConstraint(definitionData, tableAxisEvaluationPoints)

FIG. 19I illustrates an exemplary data structure 1984 that can be used to store information, such as definitions, for use with API 1981 or other software operating in system 100. For example, data structure 1984 may include identifiers that define tables used in the constraint, define a bounds on a constrained quantity, and/or that identify a function that maps a quantity to be constrained onto cells (e.g., grid points 410) of a table or other type of storage structure. In one implementation, data structure 1984 may be part of API 1981, and in another implementation, data structure 1984 may be separate from API 1981.

FIG. 19J illustrates an exemplary API that can provide greater efficiency as compared to the API of FIG. 19H in certain implementations, such as an implementation used to evaluate a table gradient constraint on a lookup table that may include filtered points in the case where the table gradient constraint can be written as a linear constraint. API 1985 can include an input portion 1986 and an output portion 1987. In one implementation, API 1985 may be used to operate with points that are not filtered, and in another implementation, API 1985 may operate with filtered points.

Input portion 1986 may include name 1963 and information 1973. Name 1963 may include identifiers about functions, files, variables, etc., that can be used to make data and/or information available to portions of system 100 via API 1985. In one implementation, name 1963 may include "constraintFunction," "definitionData," and "tableAxisEvaluationPoints" for input portion 1986 and "A," and "B" for output portion 1987. Information 1973 may include descriptions of the identifiers in name 1963 for input portion 1986 and output portion 1987, respectively.

In API 1985 (FIG. 19J), a command such as:

[A,B]=createConstraint(definitionData,tableAxisEvaluationPoints)

may be used to provide an implementation that may be more efficient than, for example, constraintFunction in API 1981. Using the representation for A and B the constraint can be evaluated using:

$$\text{constraintValues} = A * \text{quantityEvaluationPoints} - B \qquad (EQ. 24)$$

FIG. 19K illustrates an exemplary API 1988 that can include input portion 1989 and output portion 1990. In one implementation, API 1988 may be used in applications where points and/or quantities associated with the points are filtered (e.g., where a boundary is used to identify points occupying a portion of a table). Input portion 1989 may include name 1963 and information 1973. Name 1963 may include information (e.g., identifiers) about functions, files, variables, etc., that can be used to make data and/or information available to API 1988 and/or other portions of system 100. In one implementation, name may include "tableBreakpoints" and "evaluationPoints." Information 1973 may include descriptions of functions and/or other items identified in name 1963.

Output portion 1990 may include information identifying functions, files, variables, etc., that are used by API 1988 to make information available to another device or piece of software, e.g., a code-based interface, such as an API, associated with a program or device.

In one implementation, output portion 1990 may include "booleanFilter." Information 1973, related to output portion 1990, may provide descriptions of items in name 1963. A function to create a "booleanFilter" using API 1988 may have to satisfy booleanFilter=FilterFcn(tableBreakpoints,evaluationPoints)

where the function FilterFcn may determine the boundary of evaluationPoints using a convex hull or other suitable method. The booleanFilter may determine whether each cell is inside or outside the convex hull boundary. For example, booleanFilter may use "true," "1,", etc., to indicate that a cell is located inside the convex hull boundary and "false," "0," etc., to indicate that a cell is located outside the convex hull boundary.

As previously discussed, boundaries can be dilated. In one implementation, booleanFilter=FilterWithDilationFcn(tableBreakPoints,evaluationPoints)

can be used to determine the boundary of evaluationPoints using a convex hull or other suitable technique (e.g., an execution method). For example, booleanFilter is returned from this function, which may be used to identify points that are inside or outside the boundary. The filter can be dilated using techniques, such as morphological dilation, to encompass additional cells within the dilated boundary.

Many other types of APIs will be apparent to those of skill in the arts in view of the exemplary APIs described in connection with FIGS. 19A-K. APIs used with exemplary, implementations of system 100 may be transmitted from a source device, such as server 130, to a destination device, such as client 110, over network 120. For example, server 130 may be located in Europe and may perform optimizations and/or calibrations on a lookup table. An exemplary API may be used to facilitate generation of the lookup table (e.g., a calibrated lookup table) and/or to facilitate processing operations performed on points in the lookup table. Server 130 may send the API to client 110 to allow client 110 to create, process, etc., lookup tables. Other implementations of APIs may be used by a device, such as client 110, to download and/or upload lookup tables, points or quantities from lookup tables, etc., over network 120.

Exemplary User Interfaces

Figure 20:
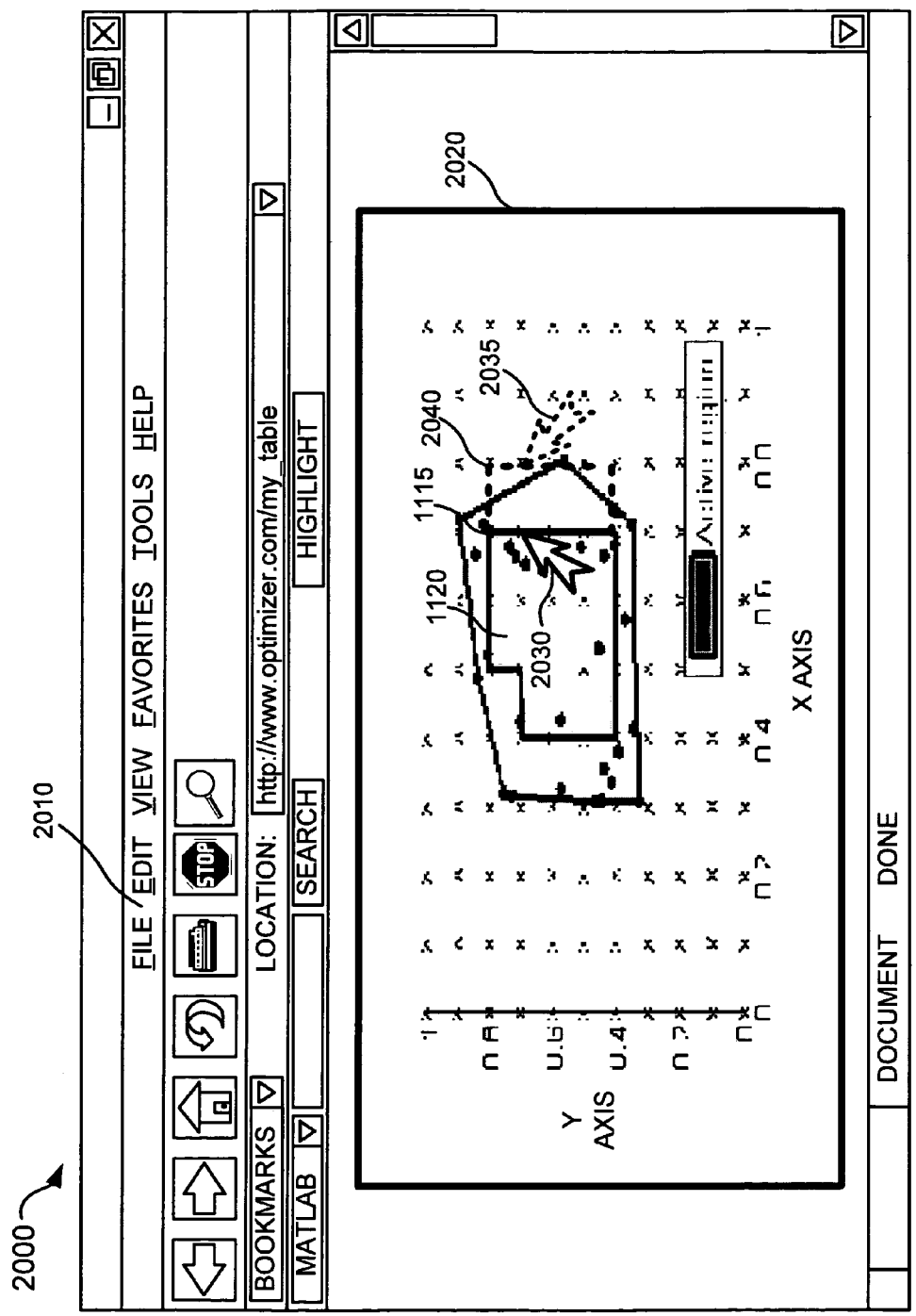
FIG. 20 illustrates an exemplary user interface that can be used with an exemplary implementation.

FIG. 20 illustrates an exemplary user interface that can be used to display lookup table related information to a user. User interface 2000 may be a graphical user interface (GUI) and may display information to a user. For example, user interface 2000 may operate locally on a computer operated by a user, or may be served to a display operated by the user via a remote device, such as server 130. In one exemplary implementation, server 130 may operate a web server and may provide information to the user via a web browser. For example, server 130 may offer a web service to client 110, where the web service allows client 110 to generate and/or interact with lookup tables.

An exemplary implementation of user interface 2000 (as shown in FIG. 20) may include boundary 1115, region 1120, toolbar 2010, window 2020, cursor 2030, displaced cursor 2035, and expanded boundary 2040. Boundary 1115 may be as described in connection with FIG. 11. Toolbar 2010 may include one or more identifiers (e.g., File, Edit, View, Favorites, Tools, Help, etc.) that cause a pull down menu to be displayed to the user when an identifier is selected by the user. A selected identifier may provide a user with functionality, such as functionality to save a file.

Window 2020 may identify a portion of a display area that includes information related to a lookup table, model 135, optimizer 137, DUT 140, DAS 150, etc. For example, window 2020 may include a lookup table, points in the lookup table, boundaries, text, equations, etc. Exemplary implementations of interface 2000 may include one or more windows 2020 that may be of fixed or variable sizes.

Cursor 2030 may include a mechanism that allows a user to identify and/or select information associated with interface 2000. In one exemplary implementation, cursor 2030 may be associated with a pointing device (e.g., a mouse, stylus, trackball, voice activated pointing device, joy stick, etc.) or other user input device (e.g., a keyboard, microphone, touch sensitive display, etc.).

A user may select information in window 2020 using cursor 2030. For example, the user may position cursor 2030 over boundary 1115 and may drag a portion of boundary 1115 to a new location (expanded boundary 2040) (shown in FIG. 20 by dashed boundary 2040 and displaced cursor 2035). The user may create expanded boundary 2040 to increase or decrease the size of an area formed by boundary 1115.

Assume, for sake of example, that the user places cursor 2030 over boundary 1115 and right clicks a mouse button to select boundary 1115. Further assume that the user drags cursor 2030 to the location identified by displaced cursor 2035 and releases the mouse button. Expanded border 2040 may be drawn at a location identified by displaced cursor 2035 when the mouse button is released. The user may resize boundary 1115 to make region 1120 larger or smaller according to user defined preferences.

Figure 21:
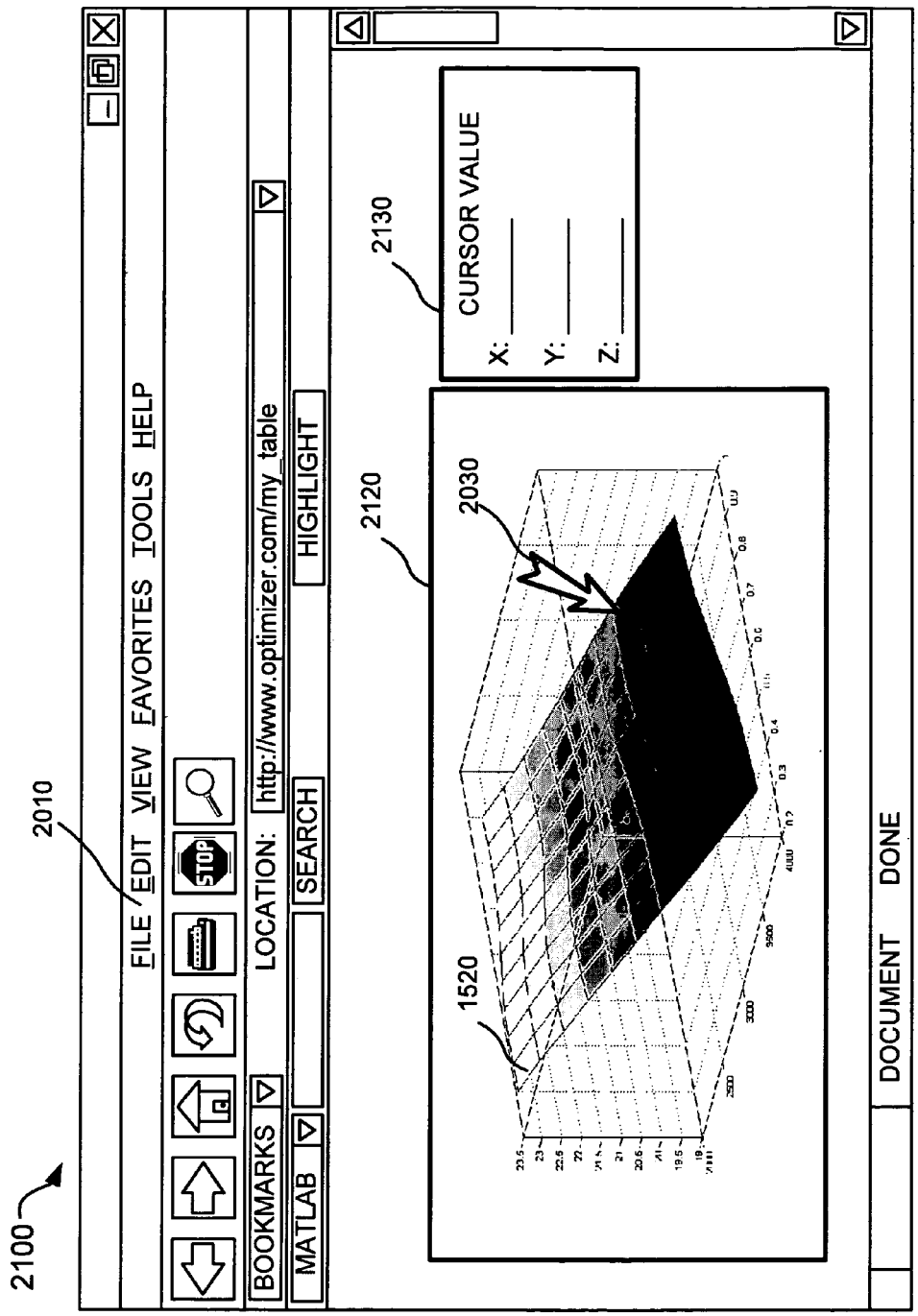
FIG. 21 illustrates an exemplary user interface that can be used with an exemplary implementation.

FIG. 21 illustrates an exemplary user interface that can be used to display information about a surface, a cursor position, display axes, etc., to a user. User interface 2100 may include toolbar 2010, cursor 2030, window 2120, and cursor window 2130. User interface 2100 may be similar to user interface 2000 and may display information to a user via an application operating locally or remotely with respect to the user.

Toolbar 2010 and cursor 2030 may operate in a manner similar to that described in connection with FIG. 20. Window 2120 may include a region of user interface 2100 that includes information related to a lookup table, a surface, an algorithm, model 135, optimizer 137, DUT 140, DAS 150, etc.

Cursor window 2130 may interact with cursor 2030 and may display information related to a position of cursor 2030. For example, cursor window 2130 may display values related to an x, y, and/or z position of cursor 2030 with respect to surface 1520. Implementations of cursor window 2130 may move with cursor 2030 or may remain stationary in user interface 2100 while cursor 2030 moves with respect to surface 1520 and/or other portions of user interface 2100.

For example, a user may calibrate a lookup table related to an engine and may display surface plot 1520. The user may wish to determine values related to portions of surface 1520. The user may place cursor 2030 at a first position over surface 1520 and cursor window 2130 may display a first x value, a first y value and a first z value. The user may then move cursor 2030 to another location related to surface 1520 and cursor window 2130 may display a second x value, a second y value, and a second z value related to the new position of cursor 2030.

Implementations of cursor window 2130 may allow the user to add values, subtract values (e.g., to determine a difference between x, y, and/or z values related to a first cursor position and a second cursor position), etc. Cursor window 2130 may further operate with a storage device, such as memory 230 (FIG. 2) to store values related to a position of cursor 2030. Other implementations of cursor window 2130 may perform still other functions Cursor 2030 or other input devices/techniques (e.g., keyboards, microphones, touch sensitive displays, etc.) may be used to control other aspects of information displayed via user interfaces 2000 and/or 2100. For example, input devices/ techniques may be used to zoom in or out, change a viewing angle for information displayed in windows 2020 or 2120, access thumbnail images and/or stored images, print information displayed via user interfaces 2000 or 2100, etc.

Exemplary techniques and/or implementations discussed herein are representative of techniques and/or implementations that can be used to practice aspects of the invention. Numerous other techniques and/or implementations are possible in light of the teachings herein and obvious equivalents thereof will be obvious to those of ordinary skill in the relevant arts.

For example, in a first alternative embodiment, optimizer 137 may operate with lookup tables that are implemented in two or more portions. For example, a lookup table may be split into a first portion that performs a pre-lookup search and one or more second portions that perform interpolation operations. The pre-lookup search portion may send an index value (e.g., an index integer) and/or a distance value (e.g., a fraction) to the one or more interpolation portions. The one or more interpolation portions may perform interpolation operations using the index value and/or distance value. For example, table gradient constraints may be used with interpolation operations performed in the interpolation portion of the lookup table to constrain quantities mapped to table cell locations. This implementation may be useful when a number of interpolation operations may use the same index value and/or distance value since the index value and/or distance value may be determined once and used by substantially any number of interpolation portions. Other configurations of split lookup tables can also be used, such as multiple pre-lookup search portions feeding one or more interpolation portions.

A second alternative embodiment may include server 130 sending information related to a calibrated lookup table to a target device, such as an embedded controller, a chip (e.g., a field programmable gate array (FPGA), an application specific integrated circuit (ASIC), a micro electromechanical switch (MEMs), etc.), a system, an application, etc. For example, server 130 may send calibrated lookup tables, or portions thereof, to the target devices, where calibrated lookup tables can include values that are constrained using table gradient constraints. Target devices may be installed in devices, subsystems, and/or systems to allow the devices, subsystems, and/or systems to perform determined functions. Target devices using lookup tables calibrated using techniques disclosed herein may provide better performance as compared to target devices that use lookup tables that are uncalibrated or that are calibrated using techniques other than those disclosed herein.

A third alternative embodiment may operate with static lookup tables and/or dynamic lookup tables, where the dynamic lookup tables can adapt to varying conditions, such as environmental conditions. For example, a dynamic lookup table may be implemented as an adaptive lookup table that includes a control signal that causes the dynamic/adaptive lookup table to adapt, or change, based on the control signal. Rates of adaptation may vary based on characteristics of the control signal. Implementations of dynamic/adaptive lookup tables may vary according to device determined parameters, user determined parameters, and/or other parameters, such as environmental parameters. Implementations of dynamic/ adaptive lookup tables may be calibrated using table gradient constraints as described herein. Dynamic/adaptive lookup tables calibrated using table gradient constraints may allow devices employing these lookup tables to better adapt performance to changing conditions, such as changing environmental conditions, changing component conditions (e.g., age related component changes), etc.

A fourth alternative embodiment may interleave a number of images containing lookup table information, such as surface plots, data points, etc., to provide a user with a moving image of lookup table information. For example a user may be able to view lookup table information in a movie mode using user interfaces 2000 and/or 2100. In one implementation, the user may view points in a lookup table that are operated on using table gradient constraints. For example, an optimizer may perform ten iterations when calibrating a lookup table. A display may provide a user with an image of the lookup table at each iteration. The displayed images may be displaced in time with respect to the display so as to provide the user with a moving image, where the moving image allows the user to see how the optimizer modifies information in the lookup table with each iteration.

A fifth alternative embodiment may be used to constrain models. For example, implementations of table gradient constraints described hereinabove may be applied to numerous types of models. By way of example, consider a model or expression, $$m = m(x_1, x_2, \ldots, x_N) \tag{EQ. 25}$$

where $[x_1, x_2, \ldots, x_N]$ are inputs to the model. The model may have been evaluated at a set of specified points, $[p_1, p_2, \ldots, p_N]$, where $p_i = [x_1^{(i)}, x_2^{(i)}, \ldots, x_N^{(i)}]$. The model evaluation may be denoted as $$m^P = [m(p_1), m(p_2), \ldots, m(p_N)] \tag{EQ. 26}$$

As illustrated in connection with EQ. 27, the table gradient constraint may be written as $$DX_t X_p^{-1} m^P \leq g \tag{EQ. 27}$$

where the difference operator, D, the matrix of model basis evaluations for the table points, $X_t$, and the matrix of model basis evaluations for the specified points, $X_p$, can be formed in a fashion similar to that described hereinabove. EQ. 8 may now be written as $$Lm^P \leq g \tag{EQ. 28}$$

which is a linear operator, L, acting on a set of quantities, $m^P$, to be constrained. It is noted that EQ. 28 may not be entirely linear since $m^P$ is a nonlinear function of $[x_1, x_2, \ldots, x_N]$. Since the only nonlinear portion of the constraint is $m^P$; the model can still be constrained using methods described hereinabove.

A sixth alternative embodiment may use a minimum magnitude gradient to restrict a gradient between two cells in a lookup table. For example, the gradient between two cells may be represented by a minimum value and a maximum value. A minimum magnitude gradient may replace the minimum value and the maximum value with a value that restricts the absolute value of the gradient between the two cells to lie below this new value. By way of example, assume that a gradient between two adjacent cells must lie between −2 and +2. A minimum magnitude gradient can be used to store the number 2 and this stored value can be used to restrict the gradient between the two adjacent cells to −2 and +2. In one implementation, a minimum magnitude gradient can be implemented for modifying gradient vector g in EQ. 28, above.

A seventh alternative embodiment may constrain two or more free variables to allow a table gradient constraint to simultaneously constrain more than one quantity. By way of example the table gradient constraint may be extended to constrain quantities other than s, such as t, u, v, etc. Implementations of table gradient constraints can constrain substantially any number of variables essentially simultaneously.

An eighth alternative embodiment may employ non-linear table gradient constraints using a number of techniques known in the relevant arts. For example, it may be desirable to constrain optimal engine torque so that the optimal torque does not vary widely between cells in a lookup table so as to provide an operator of a vehicle using the engine with a smooth driving experience. In this example, torque may represent a non linear model to which one or more non linear constraints can be applied.

A ninth alternative embodiment may apply table gradient constraints to tables that can be used in applications that can benefit from smoothness of tables containing data. An example, of one such application is image processing. For example, image blurring is an area of image processing that may benefit from the use of table gradient constraints. Assume, for sake of example, that table gradient constraints can be used to limit the gradient of an image, thereby softening the appearance of the image. Object tracking is another area of image processing that may benefit from the use of table gradient constraints. For example, a moving object may be tracked on a display device. In one implementation, it may be known that the tracked object can move with a determined velocity. Information about this velocity can be transformed into a table gradient constraint on an intensity of pixels making up the object. The use of table gradient constraints with the moving object may improve the appearance of the tracked object as it moves across the display.

Conclusion

Exemplary implementations may allow for the use of a table gradient constraint within an optimizer where the points to be optimized do not coincide with table cells (e.g., grid points). In addition, exemplary implementations may allow gradient constraint related information to be displayed to a user and/or sent to another device, such as a target device.

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, while a series of acts has been described with regard to FIGS. 12B and 17, the order of the acts may be modified in other implementations consistent with the principles of the invention. Further, non-dependent acts may be performed in parallel.

In addition, implementations consistent with principles of the invention can be implemented using devices and configurations other than those illustrated in the figures and described in the specification without departing from the spirit of the invention. Devices and/or components may be added and/or removed from the implementations of FIGS. 1-3 depending on specific deployments and/or applications. Further, disclosed implementations may not be limited to any specific combination of hardware and/or software.

Further, certain portions of the invention may be implemented as "logic" that performs one or more functions. This logic may include hardware, such as hardwired logic, an application-specific integrated circuit, a field programmable gate array, a microprocessor, software, wetware, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed is:

1. A method comprising:
identifying a plurality of first data points in a lookup table,
the lookup table being stored in memory,
the lookup table including a plurality of second data points associated with respective values,
the plurality of first data points each being associated with respective values that are associated with each other using a table gradient constraint,
the plurality of first data points each being located in a location that does not correspond to a location of any of the plurality of second data points, and
the identifying being performed by a processor executing stored instructions;
generating, using interpolation and based on the plurality of first data points and the plurality of second data points, a surface,
the generated surface including the plurality of first data points, and
the generating being performed by the processor executing the stored instructions;
estimating a plurality of interpolated values,
each of the plurality of interpolated values being estimated using the generated surface including the plurality of first data points, and
the estimating being performed by the processor executing the stored instructions the;
establishing a first boundary,
the first boundary including a first set of the plurality of first data points,
the first set of the plurality of first data points including less than all of the plurality of first data points, and
the establishing the first boundary being performed by the processor executing the stored instructions;
establishing a second boundary,
the second boundary including a second set of the plurality of first data points,
the second set of the plurality of first data points including less than all of the first set of the plurality of first data points, and
the establishing the second boundary being performed by the processor executing the stored instructions;
applying the table gradient constraint to the second set of the plurality of first data points included in the second boundary to generate constrained values,
the table gradient constraint constraining the second set of the plurality of first data points included in the second boundary to maintain variation among the second set of the plurality of first data points included the second boundary, the applying being performed by the processor executing the stored instructions; and storing the generated constrained values, the storing being performed by the processor executing the stored instructions.

2. The method of claim 1, where the lookup table has two or more dimensions.

3. The method of claim 1, where the lookup table comprises a plurality of one dimensional tables.

4. The method of claim 1, where at least some of the plurality of first data points are irregularly spaced.

5. The method of claim 1, further comprising:

receiving the plurality of first data points via an application program interface.

6. The method of claim 1, where the estimating and the applying are implemented in a software object.

7. The method of claim 1, where at least one of the estimating or the applying is a MATLAB programming language-compatible operation.

8. The method of claim 1, where the plurality of first data points are associated with a coordinate system, the method further comprising:

rotating the coordinate system prior to applying the table gradient constraint.

9. The method of claim 1, where the table gradient constraint is one of a linear constraint or a non-linear constraint.

10. The method of claim 1, further comprising:

generating code based on at least one of estimating the plurality of interpolated values or applying the table gradient constraint; and storing the generated code.

11. The method of claim 10, further comprising:

sending the generated code to at least one of a target device, an object, or an application.

12. The method of claim 1, where, when estimating the plurality of interpolated values, the method comprises:

performing at least one of interpolation operations or regression operations.

13. The method of claim 12, where, when performing the interpolation operations, the method comprises:

applying a radial basis function, a thin plate spline, a Delaunay triangulation, a spline interpolation, or a rational interpolation, or where, when performing the regression operations, the method further comprises:

applying least squares fitting or robust regression.

14. The method of claim 1, where the application of the table gradient constraint operates as a constraint on one or more differences between the second set of the plurality of first data points included in the second boundary.

15. The method of claim 1, where, when applying the table gradient constraint, the method further comprises:

calculating gradients in one or more directions using the second set of the plurality of first data points included in the second boundary.

16. The method of claim 1, where, when applying the table gradient constraint, the method further comprises:

identifying a value for at least some of the second set of the plurality of first data points included in the second boundary;

comparing the identified value with a bound for at least one gradient; and determining whether a constraint has been met based on the comparing.

17. The method of claim 1, where the lookup table is used with a target device.

18. The method of claim 1, where the table gradient constraint is used to restrict an electrical quantity, a mechanical quantity, or another type of quantity.

19. The method of claim 18, where the electrical quantity, the mechanical quality, or the other type of quantity is restricted over an operating range.

20. The method of claim 1, further comprising:

executing an optimizer with the table gradient constraint to optimize at least some of the second set of the plurality of first data points included in the second boundary.

21. The method of claim 1, where the table gradient constraint includes a minimum magnitude gradient.

22. The method of claim 1, where the estimating the plurality of interpolated values and the applying the table gradient constraint are used to constraint two or more free variables.

23. The method of claim 1, further comprising:

making the generated constrained values available to a destination based on a request.

24. A method for operating on points having values associated therewith using a table gradient constraint comprising:

downloading software to a computer system, which when executed by the computer system causes the computer system to perform operations comprising the method of claim 1, or providing downloadable software to a computer system, which when executed by the computer system causes the computer system to perform operations comprising the method of claims 1.

25. The method of claim 1, further comprising:

sending the lookup table to a device, an application, or an object.

26. The method of claim 1, where at least one of the estimating the plurality of interpolated values or the applying the table gradient constraint are associated with a spreadsheet.

27. A method comprising:

identifying a plurality of first data values in a lookup table, the plurality of first data values being associated with a system, the plurality of first data values being indicative of performance of the system under certain conditions, the lookup table being stored in memory, the lookup table including a plurality of second data values associated with respective values, the plurality of first data values each being associated with respective values that are associated with each other using a table gradient constraint, the plurality of first data values each being located in a location that does not correspond to a location of any of the plurality of second data values, and the identifying being performed by a processor executing stored instructions;

generating, using interpolation and based on the plurality of first data values and the plurality of second data values, a surface, the generated surface including the plurality of first data values, and the generating being performed by the processor executing the stored instructions;

estimating a plurality of interpolated values, each of the plurality of interpolated values being estimated using the generated surface including the plurality of first data values, and
the estimating being performed by the processor executing the stored instructions;
establishing a first boundary,
the first boundary including a first set of the plurality of first data values,
the first set of the plurality of first data values including less than all of the plurality of first data values, and
the establishing the first boundary being performed by the processor executing the stored instructions;
establishing a second boundary,
the second boundary including a second set of the plurality of first data values,
the second set of the plurality of first data values including less than all of the first set of the plurality of first data values, and
the establishing the second boundary being performed by the processor executing the stored instructions;
operating on the second set of the plurality of first data values included in the second boundary using the table gradient constraint to produce constrained values,
the table gradient constraint constraining the second set of the plurality of first data values included in the second boundary,
the constrained second set of the plurality of first data values included in the second boundary being used to evaluate performance of the system, and
the operating being performed by the processor executing the stored instructions; and
storing the produced constrained values in the lookup table,
the produced constrained values satisfying the table gradient constraint, and
the storing being performed by the processor executing the stored instructions.

28. The method of claim 27, further comprising:
dilating the second boundary.

29. The method of claim 27, where at least one of the first boundary or the second boundary is formed using one or more planes.

30. The method of claim 29, where at least one of the one or more planes is a hyper-plane.

31. The method of claim 27, where at least one of the first boundary or the second boundary is formed using at least one of a convex hull, a radial basis function interpolation, one or more support vector machines, or another boundary forming technique.

32. The method of claim 27, where the second boundary is related to an active region, and the active region identifies values that are operated on by the table gradient constraint.

33. The method of claim 27, where a Boolean map is used to determine whether the first set of the plurality of first data values are located within an active boundary.

34. The method of claim 33, further comprising:
dilating the Boolean map.

35. The method of claim 27, where the first data values in the lookup table are used to calibrate a target device.

36. The method of claim 27, further comprising:
restricting the table gradient constraint to a particular portion of the lookup table.

37. The method of claim 27, where the second boundary is used to identify a portion of the lookup table over which the operating is performed.

38. A computer-implemented method for filtering points having values associated therewith, comprising:
downloading software to a computer system, which when executed by the computer system causes the computer system to perform operations comprising the method of claim 27, or
providing downloadable software to a computer system, which when executed by the computer system causes the computer system to perform operations comprising the method of claim 27.

39. A non-transitory computer readable medium storing instructions, the instructions comprising:
one or more instructions, executable by at least one processor, to cause the at least one processor to:
identify a plurality of first data values in a lookup table,
the lookup table being stored in memory,
the lookup table including a plurality of second data values associated with respective values,
the plurality of first data values each being associated with respective values that are associated with each other using a table gradient constraint, and
the plurality of first data values each being located in a location that does not correspond to a location of any of the plurality of second data values;
generate, using interpolation and based on the plurality of first data values and the plurality of second data values, a surface,
the generated surface including the plurality of first data values;
estimate a plurality of interpolated values,
each of the plurality of interpolated values being estimated using the generated surface including the plurality of first data values;
establish a first boundary,
the first boundary including a first set of the plurality of first data values, and
the first set of the plurality of first data values including less than all of the plurality of first data values;
establish a second boundary,
the second boundary including a second set of the plurality of first data values, and
the second set of the plurality of first data values including less than all of the first set of the plurality of first data values;
apply a table gradient constraint to the second set of the plurality of first data values included in the second boundary to generate constrained values,
the table gradient constraint constraining the second set of the plurality of first data values included in the second boundary to maintain variation among the second set of the plurality of first data values included in the second boundary; and
store the generated constrained values.

40. The medium of claim 39, where the lookup table is associated with two or more dimensions.

41. The medium of claim 39, where at least some of the first data values are irregularly spaced.

42. The medium of claim 39, further comprising:
one or more instructions to receive the first data values via an application program interface.

43. The medium of claim 39, where the first data values are associated with a coordinate system, and the one or more instructions to apply the table gradient constraint further comprise:
one or more instructions to rotate the coordinate system.

44. The medium of claim 39, where the table gradient constraint is one of a linear constraint or a non-linear constraint.

45. The medium of claim 39, where the instructions further comprise:
one or more instructions to optimize at least some of the first data values.

46. The medium of claim 39, where the one or more instructions to apply the table gradient constraint further comprise:
one or more instructions to calibrate the lookup table.

47. The medium of claim 46, where the instructions further comprise:
one or more instructions to send the calibrated lookup table to at least one of a target device, an application, or an object.

48. The medium of claim 39, where one or more instructions to apply the table gradient constraint further comprise:
one or more instructions to generate code.

49. The medium of claim 48, where the instructions further comprise:
one or more instructions to send the generated code to at least one of a target device, an object, or application.

50. The medium of claim 39, where the one or more instructions to estimate the plurality of interpolated values comprise:
one or more instructions to perform at least one of interpolation operations or regression operations.

51. The medium of claim 50, where the one or more instructions to perform the interpolation operations further comprise:
one or more instructions to apply a radial basis function, a thin plate spline, a Delaunay triangulation, a spline interpolation, or a rational interpolation, or
where the one or more instructions to perform the regression operations further comprise:
one or more instructions to apply least squares fitting or robust regression.

52. The medium of claim 39, where the one or more instructions to apply the table gradient constraint further comprise:
one or more instructions to calculate gradients in one or more directions; and
one or more instructions to use the calculated gradients to apply the table gradient constraint.

53. The medium of claim 39, where the instructions further comprise:
one or more instructions to send the interpolated values to a destination.

54. The medium of claim 39, where the lookup table is used with a target device.

55. The medium of claim 39, where the table gradient constraint is used to restrict an electrical quantity, a mechanical quantity, or another type of quantity.

56. The medium of claim 55, where the electrical quantity, the mechanical quantity, or the other type of quantity is restricted over an operating range.

57. The medium of claim 39, where the instructions further comprise:
one or more instructions to execute an optimizer on the table gradient constraint to optimize at least some of the first data values in the lookup table.

58. The medium of claim 39, where the table gradient constraint includes a minimum magnitude gradient.

59. The medium of claim 39, wherein the one or more instructions to estimate the plurality of interpolated values and the one or more instructions to apply the table gradient constraint are used to constrain two or more free variables.

60. The medium of claim 39, where the instructions further comprise:
one or more instructions to make the generated constrained values available to a destination based on a request.

61. The medium of claim 39, where at least one of the one or more instructions to estimate the plurality of interpolated values or the one or more instructions to apply the table gradient constraint are associated with a spreadsheet.

62. A non-transitory computer readable medium storing instructions, the instructions comprising:
one or more instructions, executable by at least one processor, to cause the at least one processor to:
identify a plurality of first data values in a lookup table,
the plurality of first data values being associated with a system,
the plurality of first data values being indicative of performance of the system under certain conditions,
the lookup table being stored in memory,
the lookup table including a plurality of second data values associated with respective values,
the plurality of first data values each being associated with respective values that are associated with each other using a table gradient constraint, and
the plurality of first data values each being located in a location that does not correspond to a location of any of the plurality of second data values;
generate, using interpolation and based on the plurality of first data values and the plurality of second data values, a surface,
the generated surface including the plurality of first data values;
estimate a plurality of interpolated values,
each of the plurality of interpolated values being estimated using the generated surface including the plurality of first data values, and
establish a first boundary,
the first boundary including a first set of the plurality of first data values,
the first set of the plurality of first data values including less than all of the plurality of first data values;
establish a second boundary,
the second boundary including a second set of the plurality of first data values,
the second set of the plurality of first data values including less than all of the first set of the plurality of first data values;
operate on the second set of the plurality of first data values included in the second boundary using the table gradient constraint to produce constrained values,
the table gradient constraint constraining the second set of the plurality of first data values included in the second boundary, and
the constrained second set of the plurality of first data values included in the second boundary being used to evaluate performance of the system; and
transmit the produced constrained values.

63. The medium of claim 62, where the instructions further comprise:
one or more instructions to dilate the second boundary.

64. The medium of claim 62, where at least one of the first boundary or the second boundary is formed using one or more planes.

65. The medium of claim 64, where at least one of the one or more planes is a hyper-plane.

66. The medium of claim 62, where at least one of the first boundary or the second boundary is formed using at least one of a convex hull, a radial basis function interpolation, one or more support vector machines, or another boundary forming technique.

67. The medium of claim 62, where the second boundary is related to an active region, and the active region identifies values that are operated on by the table gradient constraint.

68. The medium of claim 62, where a Boolean map is used to determine whether the first set of the plurality of first data values are located within an active boundary.

69. The medium of claim 68, where the instructions further comprise:
one or more instructions to dilate the Boolean map.

70. The medium of claim 62, where the first data values are used to calibrate a target device.

71. The medium of claim 62, where the instructions further comprise:
one or more instructions to restrict a table gradient constraint to a particular portion of the lookup table.

72. The medium of claim 62, where the second boundary identifies is used to identify a portion of the lookup table.

73. A device comprising:
a memory to store instructions; and
a processor to execute the instructions to:
identify a plurality of first data values in a lookup table,
the lookup table being stored in the memory,
the lookup table including a plurality of second data values associated with respective values,
the plurality of first data values each being associated with respective values that are associated with each other using table gradient constraint, and
the plurality of first data values each being located in a location that does not correspond to a location of any of the plurality of second data values;
generate, using interpolation and based on the plurality of first data values and the plurality of second data values, a surface,
the generated surface including the plurality of first data values;
estimate a plurality of interpolated values,
each of the plurality of interpolated values being estimated using the generated surface including the plurality of first data values;
establish a first boundary,
the first boundary including a first set of the plurality of first data values,
the first set of the plurality of first data values including less than all of the plurality of first data values;
establish a second boundary,
the second boundary including a second set of the plurality of first data values,
the second set of the plurality of first data values including less than all of the first set of the plurality of first data values;
apply the table gradient constraint to the second set of the plurality first data values included in the second boundary to generate a result; and
use the generated result to perform an operation.

74. The device of claim 73, where the first data values are associated with information associated with an engine.

75. A device comprising:
a memory to store instructions; and
a processor to execute the instructions to:
identify a plurality of first data values in a lookup table,
the plurality of first data values being associated with a system,
the plurality of first data values being indicative of performance of the system under certain conditions,
the lookup table being stored in memory,
the lookup table including a plurality of second data values associated with respective values,
the plurality of first data values each being associated with respective values that are associated with each other using a table gradient constraint, and
the plurality of first data values each being located in a location that does not correspond to a location of any of the plurality of second data values;
generate, using interpolation and based on the plurality of first data values and the plurality of second data values, a surface,
the generated surface including the plurality of first data values;
estimate a plurality of interpolated values,
each of the plurality of interpolated values being estimated using the generated surface including the plurality of first data values;
establish a first boundary,
the first boundary including a first set of the plurality of first data values,
the first set of the plurality of first data values including less than all of the plurality of first data values;
establish a second boundary,
the second boundary including a second set of the plurality of first data values,
the second set of the plurality of first data values including less than all of the first set of the plurality of first data values;
perform an operation on the second set of the plurality first data values included in the second boundary using the table gradient constraint to produce constrained values,
the table gradient constraint constraining the second set of the plurality first data values included in the second boundary, and
the constrained second set of the plurality first data values included in the second boundary being used to evaluate performance of the system; and
optimize the produced constrained values to produce a result.

76. The device of claim 75, where at least a portion of the first data values are filtered, and the processor, when identifying the plurality of first data values, is further to:
identify the filtered first data values.

77. The device of claim 75, where the processor is further to:
provide, for presentation, the generated surface.

78. The device of claim 75, where the processor is further to:
send the produced result to a target device.

79. The device of claim 75, where the processor executes MATLAB programming language-compatible commands.

80. The device of claim 75, where the processor is further to:
provide the produced results to a destination as a managed service.

81. The device of claim 75, where the processor is further to:
receive the first data values from a device under test.

82. The device of claim 75, the first data values are associated with a model.

* * * * *